Nov. 22, 1966   D. W. BROSNAN   3,286,648
RAIL RENEWAL PROCESS
Filed Aug. 30, 1963   15 Sheets-Sheet 1
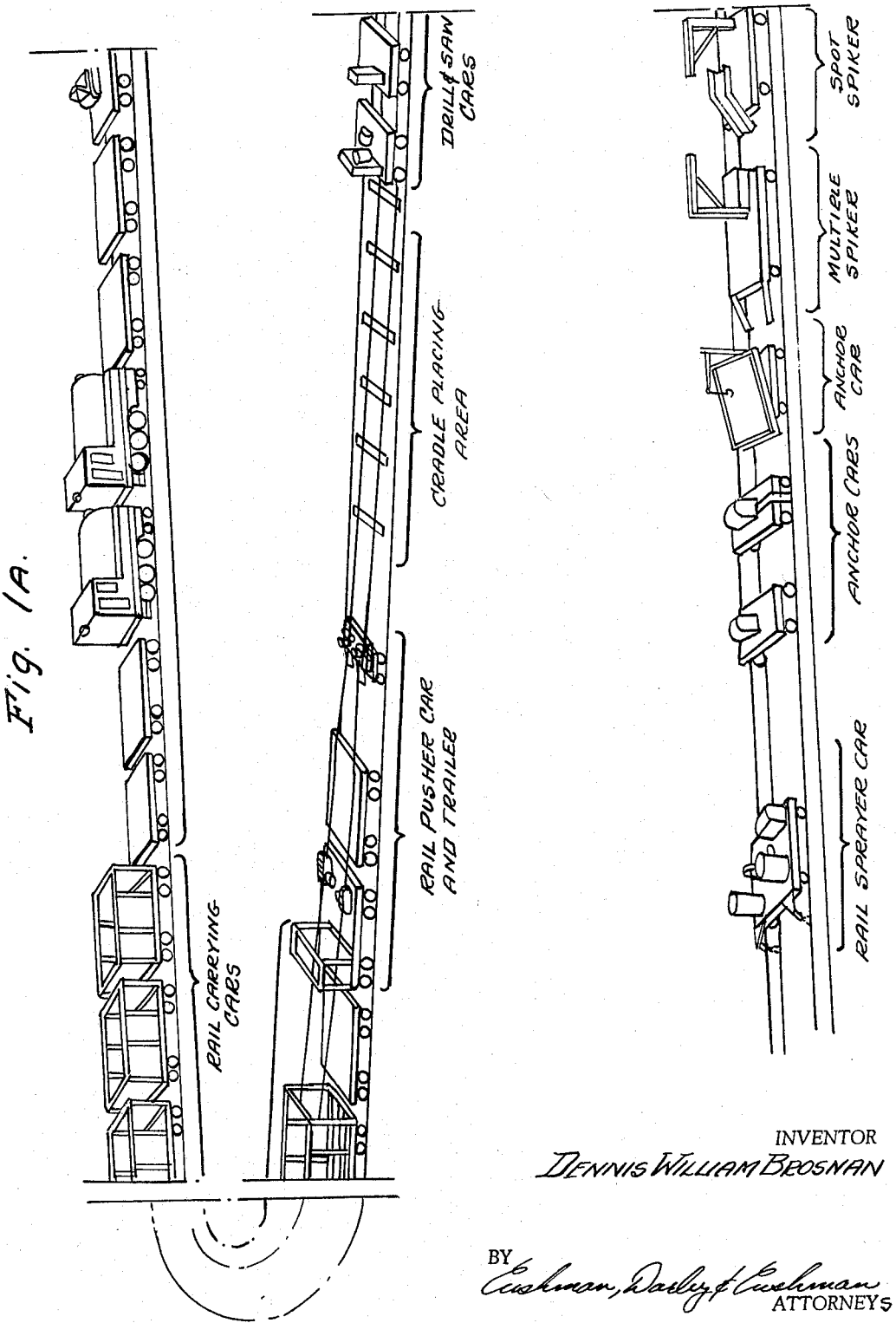
INVENTOR
DENNIS WILLIAM BROSNAN
BY
Cushman, Darby & Cushman
ATTORNEYS

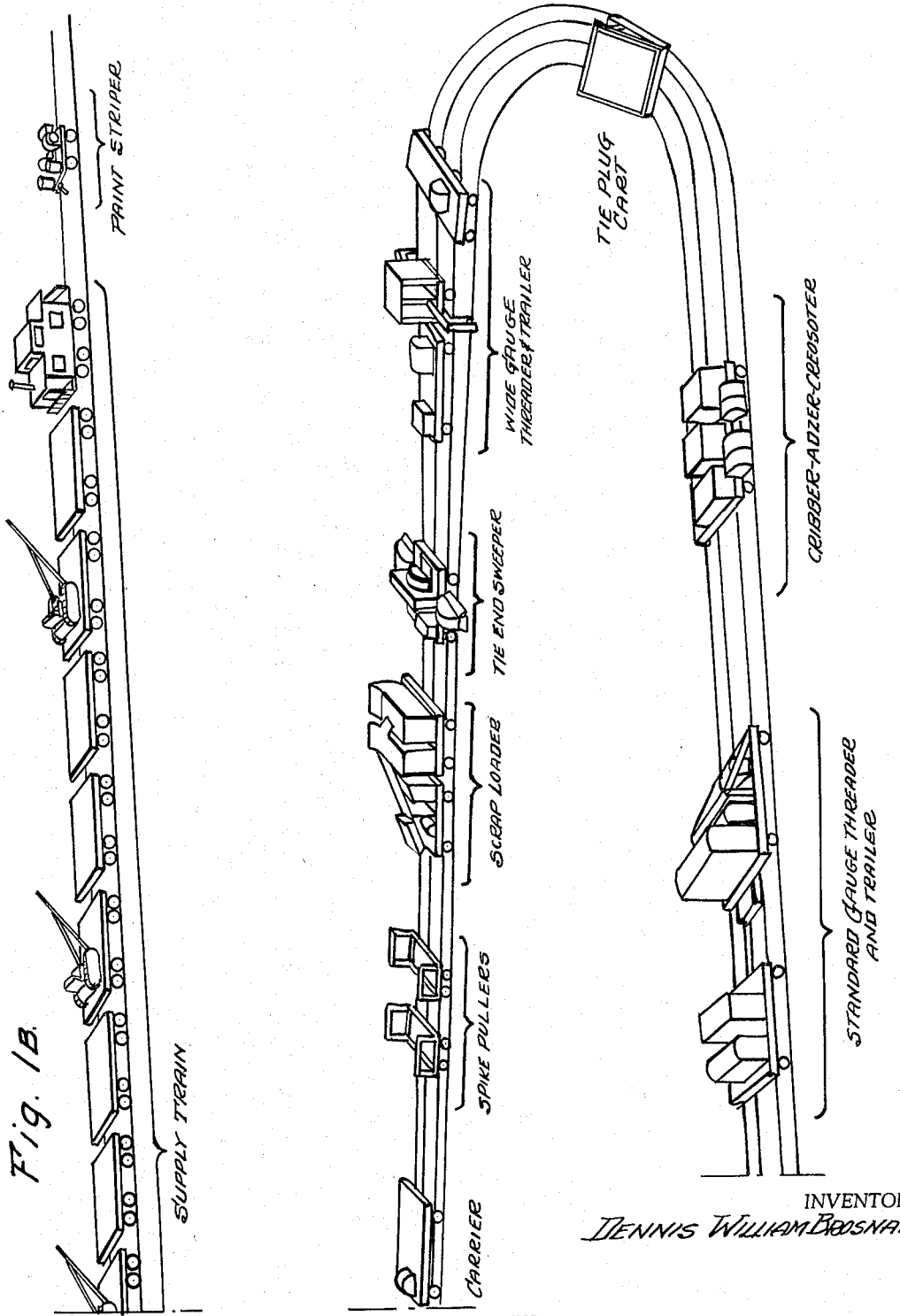

Nov. 22, 1966  D. W. BROSNAN  3,286,648
RAIL RENEWAL PROCESS
Filed Aug. 30, 1963  15 Sheets-Sheet 3

INVENTOR
DENNIS WILLIAM BROSNAN

BY
Cushman, Darby & Cushman
ATTORNEYS

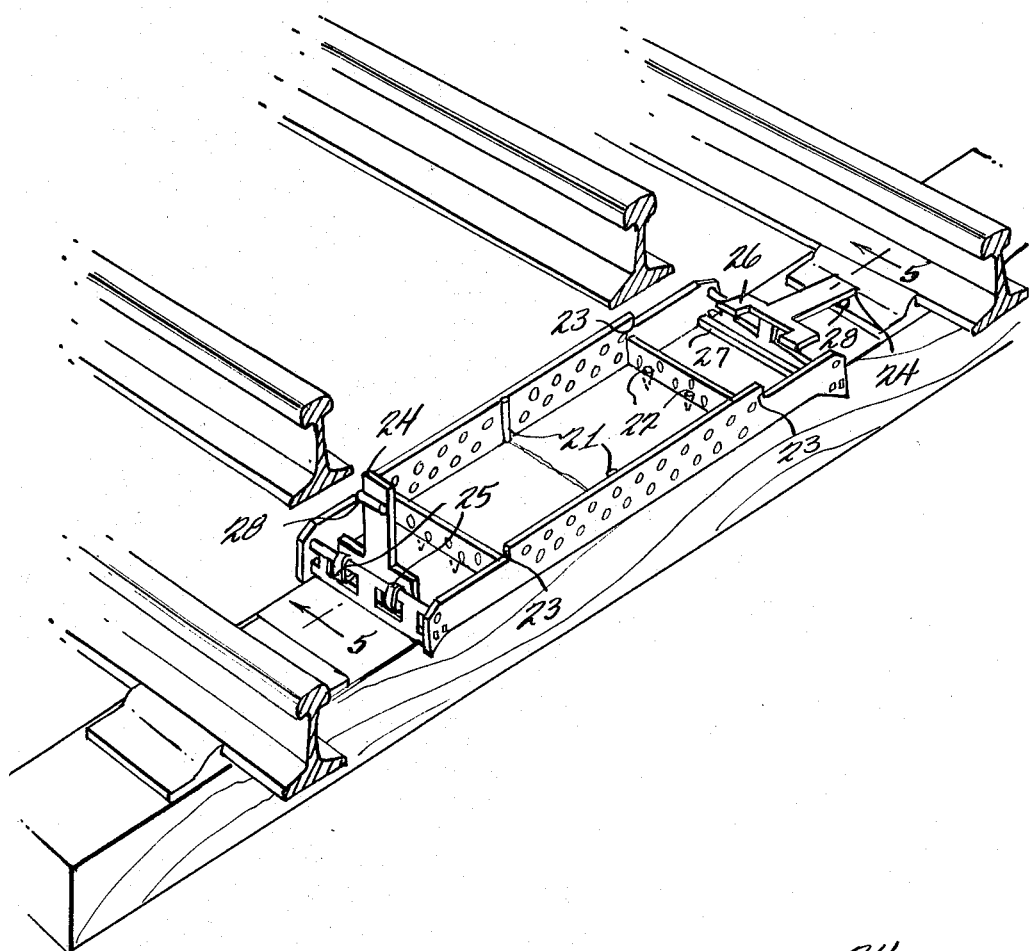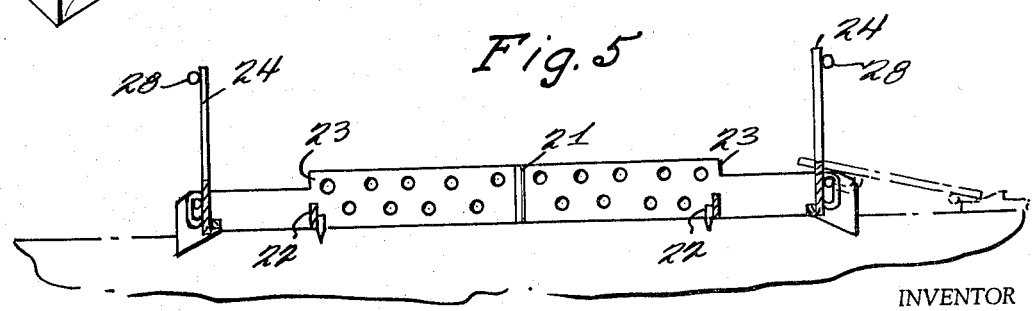

INVENTOR
DENNIS WILLIAM BROSNAN

Nov. 22, 1966        D. W. BROSNAN        3,286,648
                    RAIL RENEWAL PROCESS
Filed Aug. 30, 1963                    15 Sheets-Sheet 6
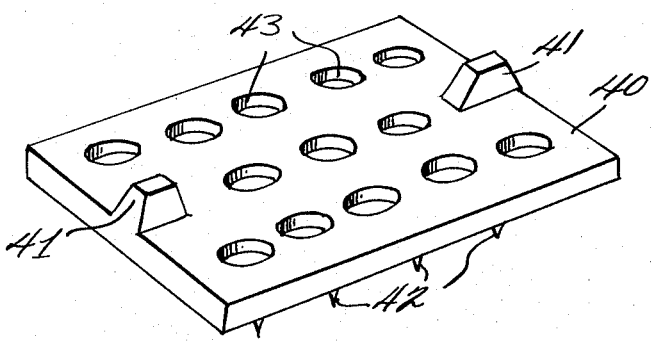
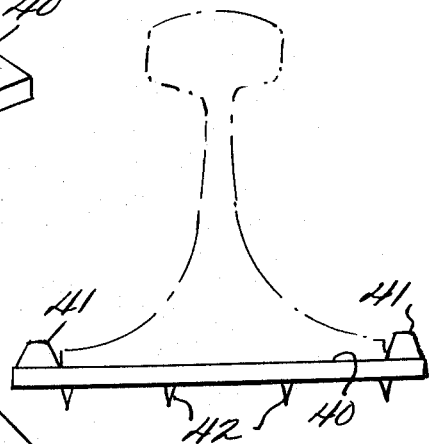
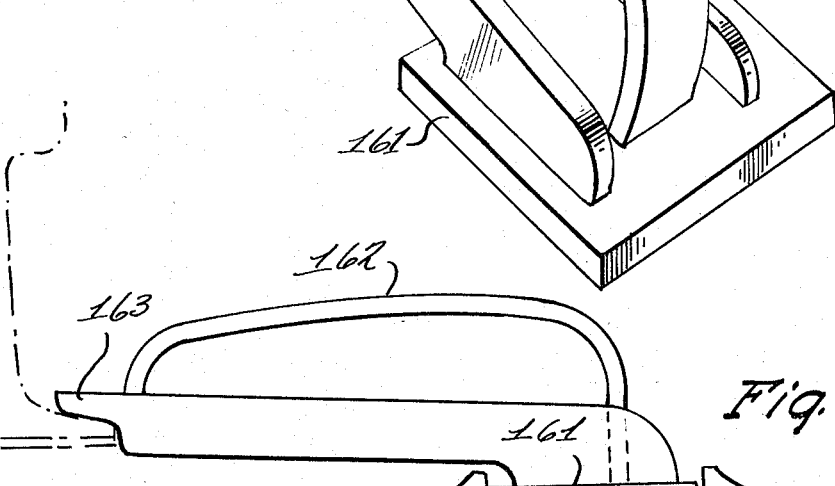
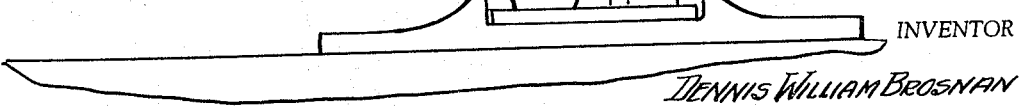
INVENTOR
DENNIS WILLIAM BROSNAN
BY Cushman, Darby & Cushman
ATTORNEYS

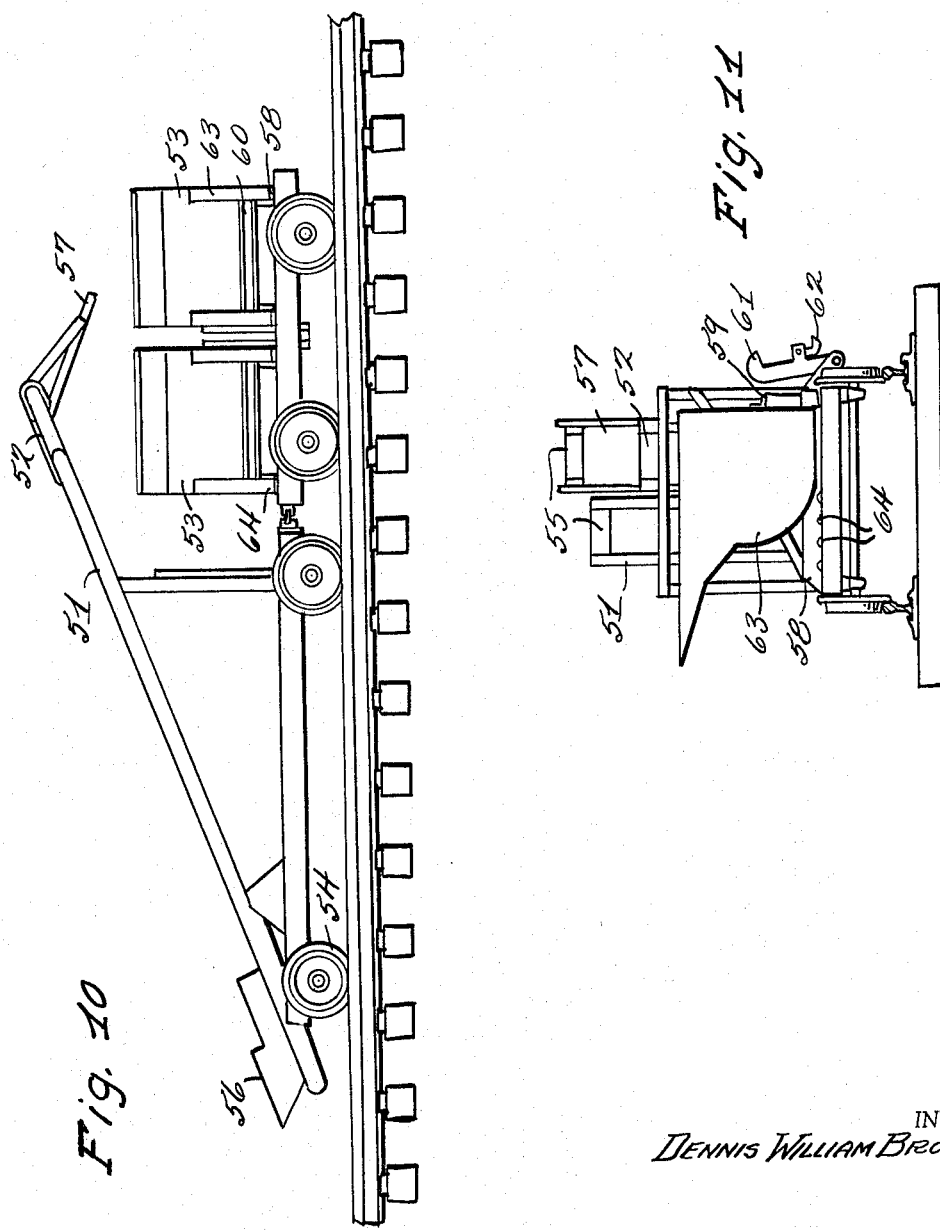

Nov. 22, 1966   D. W. BROSNAN   3,286,648
RAIL RENEWAL PROCESS
Filed Aug. 30, 1963   15 Sheets-Sheet 8
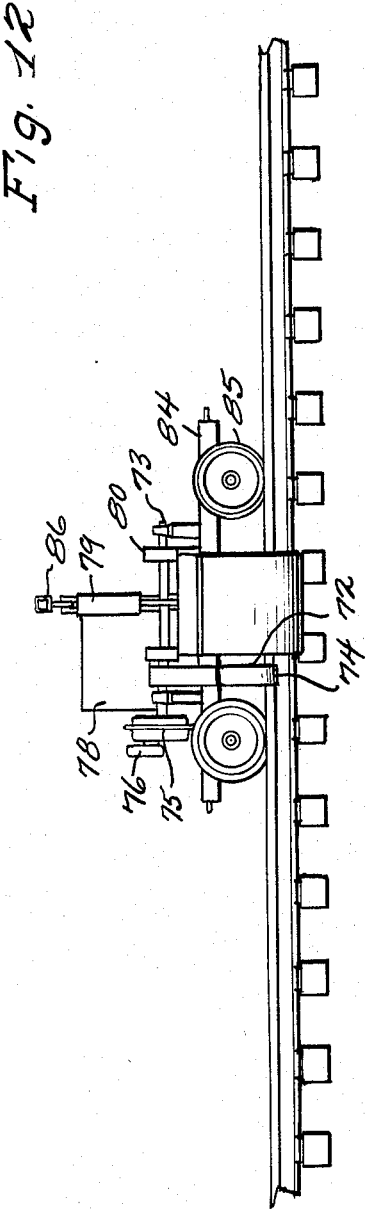
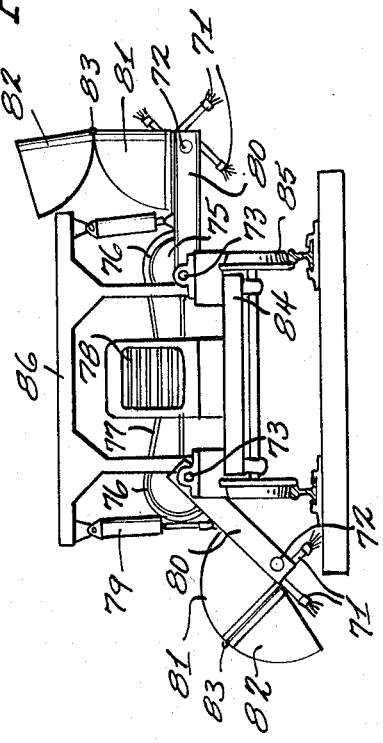
INVENTOR
DENNIS WILLIAM BROSNAN
BY
Cushman, Darby & Cushman
ATTORNEYS

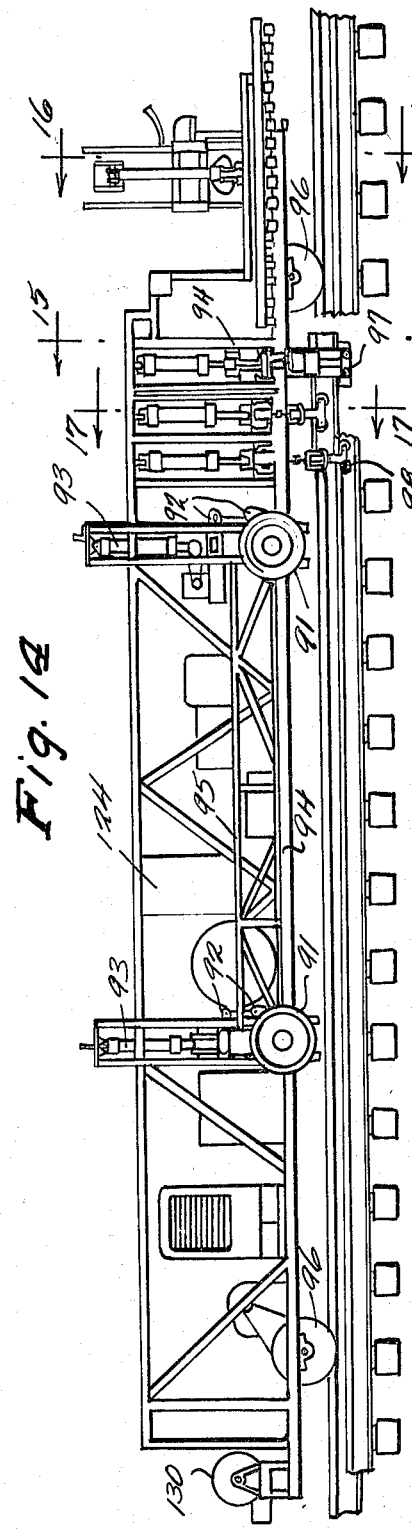

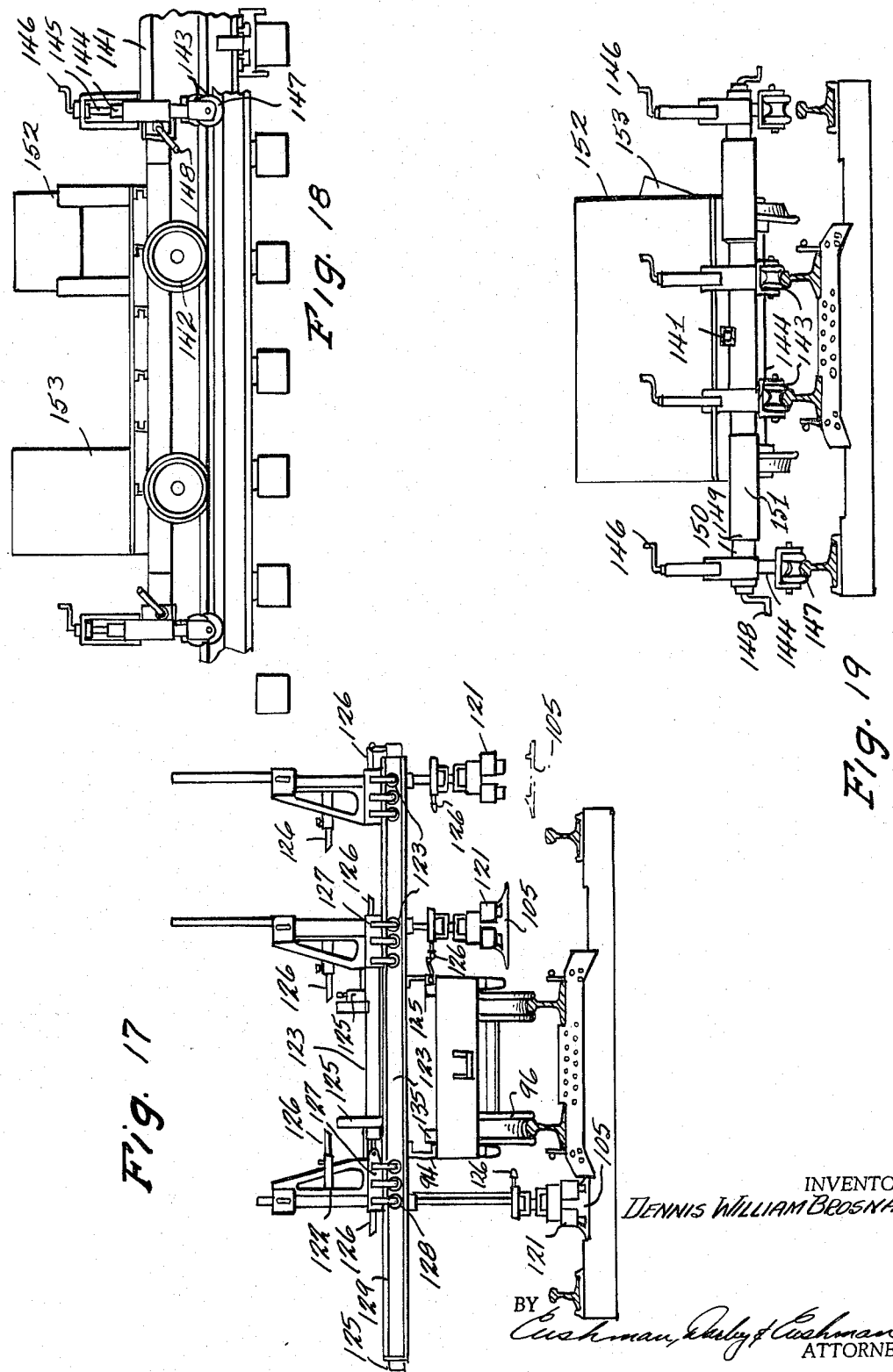

Nov. 22, 1966   D. W. BROSNAN   3,286,648
RAIL RENEWAL PROCESS
Filed Aug. 30, 1963   15 Sheets-Sheet 11
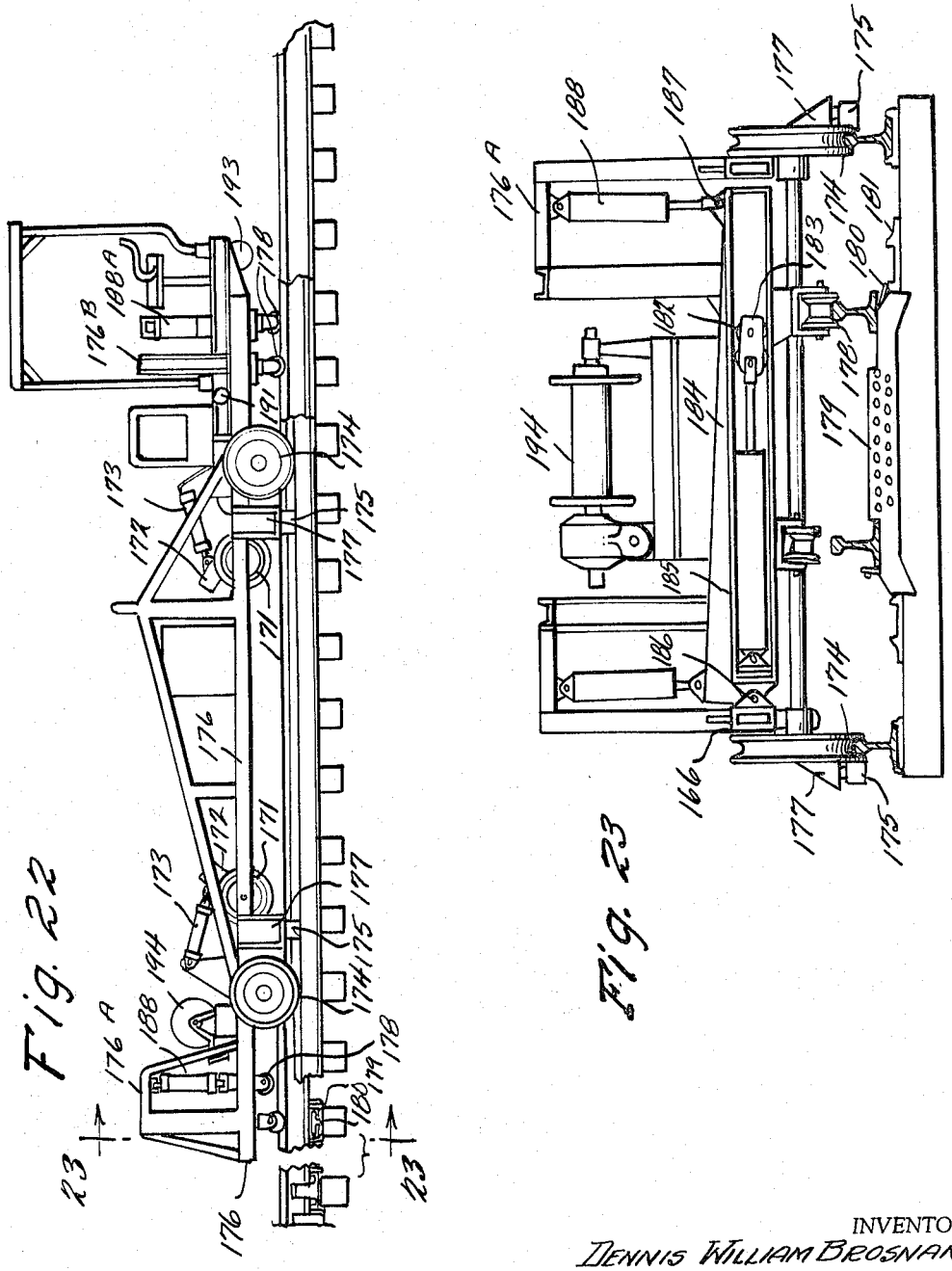
INVENTOR
DENNIS WILLIAM BROSNAN
BY
Cushman, Darby & Cushman
ATTORNEYS Nov. 22, 1966   D. W. BROSNAN   3,286,648
RAIL RENEWAL PROCESS
Filed Aug. 30, 1963   15 Sheets-Sheet 12
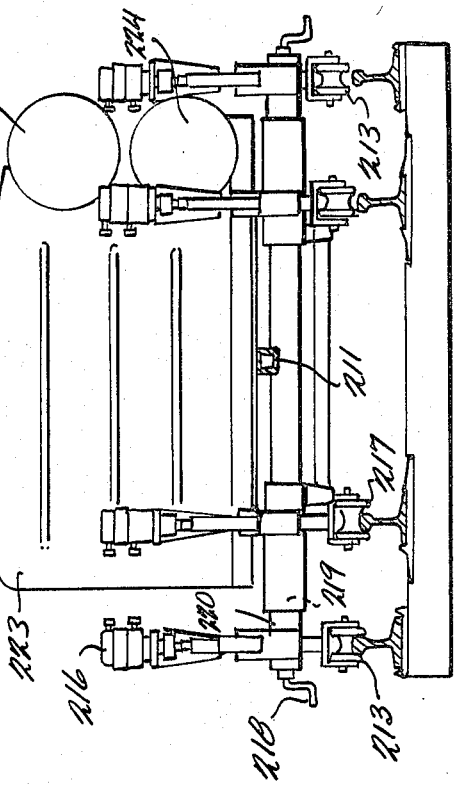
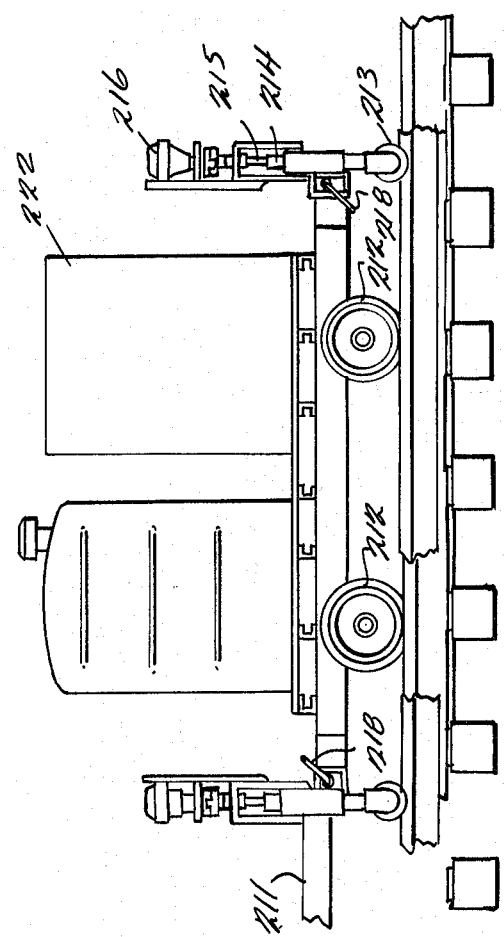
INVENTOR
DENNIS WILLIAM BROSNAN
BY
Cushman, Darby & Cushman
ATTORNEYS Nov. 22, 1966       D. W. BROSNAN       3,286,648
                    RAIL RENEWAL PROCESS
Filed Aug. 30, 1963                   15 Sheets-Sheet 14

INVENTOR
DENNIS WILLIAM BROSNAN
BY Cushman, Darby & Cushman
                        ATTORNEYS Nov. 22, 1966   D. W. BROSNAN   3,286,648
RAIL RENEWAL PROCESS
Filed Aug. 30, 1963   15 Sheets-Sheet 15

INVENTOR
DENNIS WILLIAM BROSNAN

BY
Cushman, Darby & Cushman
ATTORNEYS ates Patent Office 3,286,648
Patented Nov. 22, 1966

3,286,648
RAIL RENEWAL PROCESS
Dennis William Brosnan, Box 1808, Washington, D.C.
Filed Aug. 30, 1963, Ser. No. 305,725
33 Claims. (Cl. 104—2)

The present invention relates to an improved rail renewal process and, more particularly, to a method and apparatus for replacing the rails of a standard gauge track on existing ties of a track structure with continuous ribbon rails.

A number of arrangements have been utilized in the past to replace worn rails in a track structure by substituting new rails of the same or greater lengths than those replaced. A basic method has been a principally manual operation wherein a short length of rail being replaced is unjointed and moved away from the standard gauge position to permit reconditioning of the ties following which a new rail is inserted in the position formerly occupied by the replaced rail. In this process, the old rail serves no function once removed from its standard gauge position and the new rail is not used until secured in its final position. Thus, the entire process is a series of distinct operations lacking continuity.

Other systems have been developed which have attempted to achieve continuity greater than that afforded by the arrangement just described. In such systems, strands, or ribbons, of rail formed by jointing or welding conventional lengths of rail are laid by mechanical means. In some cases the old rail is utilized during the rail laying process. However, the new rail serves no function in these prior systems and therefore the system remains one of separate operational processes thereby preventing complete continuity.

The rail renewal process of the invention departs from prior art arrangements in providing an improved, integrated, continuous system for replacing existing rails with ribbons of new rail which may be several hundred feet long, the process allowing removal of old rail simultaneous with the laying of new rail.

An important object of the present invention is to overcome the shortcomings of prior art arrangements by an operation utilizing both the old and new rails during the renewal process to permit a completely continuous process whereby old rail is removed simultaneously with the laying of long ribbons of new rail.

Ancillary to the immediately preceding object it is a further object of the invention to provide apparatus operative on the old and new track for continuous renewal of the old track.

Another object of the invention is to form a scribed mark on the ties by which accurate gauging of the rails positioned during the continuous operation is achieved.

Ancillary to the immediately preceding object, it is a further object of the invention to provide equipment for scribing a reference mark midway between existing rails at narrow gauge.

Still another object is to form a first service track at narrow gauge and a second service track at wide gauge to permit a completely continuous operation whereby old rail may be removed simultaneously with the laying of new rail.

An additional object is to form a narrow gauge service track by utilizing equipment operating on existing standard gauge track.

A further object is to provide a rail guide cart for threading continuous lengths of new rails to a narrow gauge.

Another object is to provide a cradle for holding and gauging threaded new rails in position as a narrow gauge service track.

Still another object is to provide a tie end sweeper for cleaning the ends of ties outwardly of the standard gauge track.

A further object is to form a wide gauge service track by employing equipment on a narrow gauge service track to spread old rail at standard gauge to wide gauge.

An additional object is to provide a wide gauge threader for spreading old rails outwardly from standard gauge to wide gauge.

Ancillary to the immediately preceding object, it is a further object to provide a wide gauge cart for gauging the old rails at wide gauge to form a wide gauge service track.

Another object is to provide a wide gauge tie plate for holding the old rails at wide gauge.

Still another object is to form a new standard gauge track by operating equipment on a wide gauge service track to spread new rail from narrow gauge to standard gauge.

Ancillary to the immediately preceding object, it is a further object to provide a standard gauge threader for spreading new rails at narrow gauge track to standard gauge.

Another object is to reference one new rail at standard gauge with respect to a mark scribed on a tie to permit the other rail to be accurately positioned with respect to the first rail.

Ancillary to the immediately preceding object, it is a further object to provide a gauging spiker to gauge and spot spike the new rail at standard gauge.

A further object is to provide equipment operating on standard gauge track for completely spiking and anchoring new rails at standard gauge.

Another object is to remove the wide gauge service track to leave only the new rails at standard gauge.

An additional object is to provide equipment operating on new rails at standard gauge for oiling the rails to prevent corrosion thereof.

Further objects and the entire scope of the invention will become more fully apparent when considered in light of the following detailed description of an illustrative embodiment of the invention and from the appended claims.

The illustrative embodiment may be best understood by reference to the accompanying drawings wherein:

FIGURES 1A and 1B constitute a flow diagram in perspective of the rail renewal process of the invention;

FIGURE 4 is a perspective view of the narrow gauge cradle illustrating the spacing between a pair of rails at narrow gauge;

FIGURE 5 is a longitudinal sectional view taken along line 5—5 of FIGURE 4;

FIGURE 8 is a view in perspective of the wide gauge tie plate;

FIGURE 9 is a side elevation view of a wide gauge tie plate as shown in FIGURE 8, a rail being indicated in dash lines to illustrate the manner in which a rail is seated in this plate;

FIGURE 10 is a side elevation view of the conveyor salvage car, or scrap loader;

FIGURE 11 is an end elevation view of the conveyor salvage car shown in FIGURE 10;

FIGURE 12 is a side elevation view of the cribber brush machine, or tie end sweeper;

FIGURE 13 is an end elevation view of the cribber brush machine shown in FIGURE 12;

FIGURE 14 is a side elevation view of the wide gauge threader;

FIGURE 15 is a vertical sectional view taken along line 15–15 of FIGURE 14;

FIGURE 16 is a vertical sectional view taken along line 16–16 of FIGURE 14;

FIGURE 17 is a vertical sectional view taken along line 17–17 of FIGURE 14;

FIGURE 18 is a side elevation view of the wide gauge threader trailer, or wide gauge cart;

FIGURE 19 is an end elevation view of the wide gauge threader trailer of FIGURE 18;

FIGURE 20 is a perspective view of the plate lining trowel;

FIGURE 21 is a side elevation view of the plate lining trowel shown in FIGURE 20 illustrating its use in gauging a tie plate with respect to a new rail;

FIGURE 22 is a side elevation view of the standard gauge threader;

FIGURE 23 is a vertical sectional view taken along line 23—23 of FIGURE 22;

FIGURE 25 is a side elevation view of the standard gauge threader trailer;

FIGURE 26 is an end elevation view of the standard gauge threader trailer shown in FIGURE 25;

Figure 2:
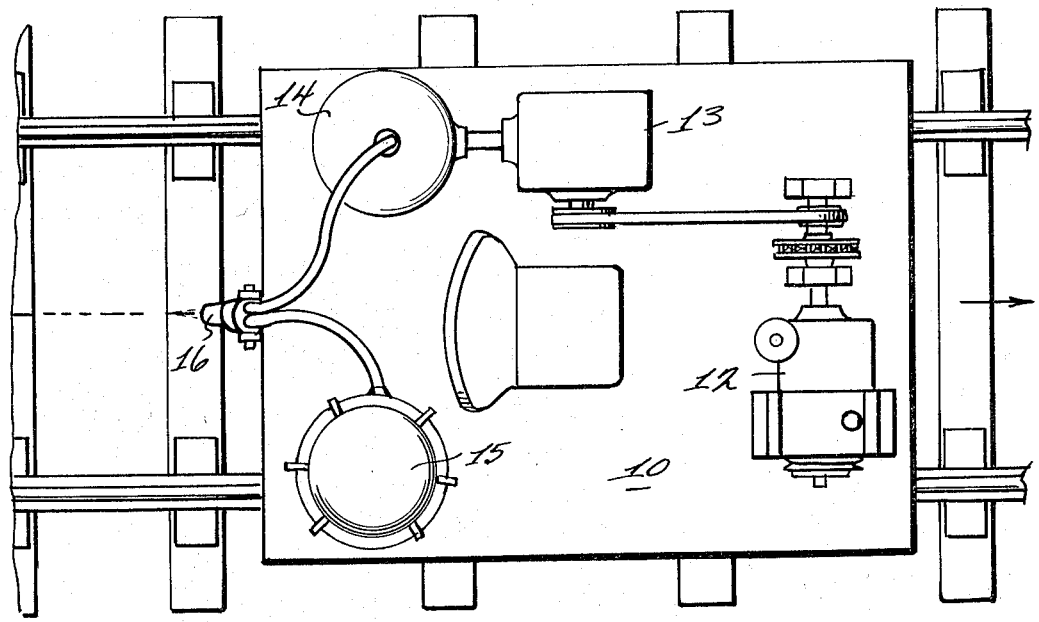
FIGURE 2 is a top plan view of the self-propelled line painting machine or paint striper.

Briefly, the invention comprises a process for renewal of rail, and machines for performing this process, by which extended lengths of two old rails of a railway track structure are simultaneously removed and replaced by extended lengths of two new rails in a single one-direction pass of the machines. The new rails are first placed at narrow gauge inside the old rails at standard gauge. The latter are loosened and spread out to wide gauge and then the new rails are spread out to standard gauge and are secured. The old rails are then removed.

Referring to the flow diagram comprising FIGURES 1A and 1B, the rail renewal process may be described in detail.

The first step of the process utilizes a piece of equipment travelling on the old rails of standard gauge which are to be replaced by welded strands of rail. This equipment scribes a mark on each of the ties longitudinally of the standard gauge track and midway between the old rails to be replaced. In the embodiment disclosed, the scribing is in the form of a stripe painted on each of the ties by means of a line painting machine, or paint striper. This machine comprises paint spray apparatus mounted on a railway motor car which is self-propelled along the existing standard gauge track.

The new rails to be laid are initially gauged with respect to the scribed mark by means of narrow gauge cradles, having rail base flange-receiving recesses therein spaced apart at the narrow gauge, the cradles being positioned on spaced ties such that a reference mark on each of the cradles is aligned with the mark on the ties. The narrow gauge cradle is a device which temporarily supports the two new rails in a position between the existing rails and above the cross ties. As can be seen in the flow diagram of FIGURES 1A and 1B, the cradles are placed at intervals on the cross ties rearwardly of the rail pusher car which will be hereinafter described.

The new rails are then laid at narrow gauge between the existing rails at standard gauge to form a service track. The laying of the new rails is accomplished by continuously threading the new rails into recesses in the narrow gauge cradles. The threading is done by means of a rail pusher, mounted on a car at the rear end of the train of rail rack cars, as shown. The rail pusher unloads new rail in extended lengths from the train as the train moves forward from the beginning of the new rail. A rail guide cart cooperates with the rail pusher to insure that the new rails are properly threaded into the cradle recesses. When the new rails are initially laid, the ends of these rails overlap the ends of the old rails of the standard gauge track to which the new rails are to be jointed to permit the machines, to be hereinafter described, of the rail laying process to move from the track on the flat cars of the work train onto the ground track on which these machines operate.

The rail guide cart is followed by a multiple rail drill and high speed friction saw used for closing up rail at the end of a day's work or for installing insulated joints. Rail drill and the rail saw are pushed by a carrier car which has a flat bed equipped with rails on which hydraulic spike pullers are loaded and carried to and from the job. The carrier car has a built-in ramp so that the spike pullers may be easily removed to and from the carrier car.

In the flow diagram there are illustrated four spike pulling machines which are pushed by the operators as they progress. These machines are utilized to remove the spikes on the standard gauge track. The pulling of the spikes is followed by the removal of rail anchors from the existing rails at standard gauge. As is obvious, the equipment for performing the functions just described travels on the standard gauge track moving in the same direction and following the equipment which has threaded the new rails into the cradle recesses.

Immediately following the spike pullers is a conveyor salvage car or scrap loader having inclined conveyors thereon on which are placed the rail anchors and spikes which have been removed from association with the standard gauge track. These conveyors direct the rail anchors to one storage bin and the spikes to another bin.

The scrap loader is coupled to a tie end sweeper, or cribber brush machine, which cleans the ends of the tie outwardly of the standard gauge track. The scrap loader and tie end sweeper are both propelled on the standard gauge track by a wide gauge threader which follows the loader and the sweeper.

The wide gauge threader is a self-propelled machine which moves and functions on the new rails at narrow gauge. In operation, this threader simultaneously lifts the extended lengths of the old rails after they have been unjointed from the rails of the standard gauge track to which the new rails are to be jointed, spreads them out, and lays them down on the ends of the cross ties at wide gauge on the wide gauge tie plates which have previously been placed at intervals along the track, principally on curves, at or near the ends of the cross ties. The old rails which have been moved outwardly are gauged at a predetermined wide gauge to form a second service track. This gauging is performed by a wide gauge cart, or trailer, following the threader and operating on rails at narrow gauge to perfect the setting of the old rails at wide gauge by means of two sets of four double flanged rollers, one pair being on each rail. The old tie plates are then removed and the holes in the ties are plugged from a tie plug cart which moves on the rails at narrow gauge following the wide gauge cart. The ties in the areas of the removed old tie plates are then reconditioned. Both the wide gauge cart and the tie plug cart are pulled by the wide gauge threader.

The steps in reconditioning the ties include first cribbing the ballast between the ties, in the area where the ties are to be reconditioned, to a depth greater than that required for adzing prior to the step of adzing. The actual reconditioning is performed by a dual cribber adzer creosoter which is a self-propelled machine moving on the rails at narrow gauge by means of double flanged wheels. The adzing of the ties provides a new bearing surface and a creosoting serves to preserve the ties in the reconditioned areas.

New tie plates are then installed on the reconditioned areas of the ties, and these plates are gauged by means of a trowel-like device, to be hereinafter described in detail, to receive the rails of the narrow gauge service track. The gauging position of these tie plates is taken from the base flanges of the narrow gauge service track closest to the tie plate.

The narrow gauge service track is then pulled forward until the overlapping ends of this track are even with the ends of the rails of standard gauge to which the new rails will be jointed to permit splicing. The new rails constituting the narrow gauge service track are then spread to the new tie plates. This spreading is performed by a standard gauge threader which is a self-propelled machine moving and functioning on the old rails at wide gauge. This machine spreads the new rails from their narrow gauge position on the cradle onto the new tie plates. The narrow gauge track is initially spread slightly wider than the standard gauge. One of the new rails is then gauged by means of a half gauge indicator, with respect to the scribe marks on the ties to align this rail with the painted center line stripe. This rail is then spot spiked to ties separated by a number of other ties. The other new rail is then moved and spot spiked after gauging with respect to the initially gauged and spiked new rail to ties also separated by a number of other ties. This is accomplished by a standard gauge threader trailer and gauging spiker. The trailer rolls with double flanged rollers, set at standard gauge, on the new rails thus bringing the other rail to gauge distance from the rail which was originally gauged and spot spiked. The gauging spiker travels and functions on rails at standard gauge. This machine has clamps which grasp and hold the rails against gauging heads and the rail not previously spiked and the tie plates on which it rests are thus brought to gauge and alignment. At this time the other rail is spot spiked.

The gauging spiker is followed by rail laying auto spiker and an anchor cart. Both of these machines travel on rails at standard gauge. The rail laying auto spiker has spike hammers thereon by which the new rails may be completely spiked to all of the ties. The rail anchor cart is followed by anchor machines provided with means for applying the rail anchors, supplied from the rail anchor cart, to the rail flanges at each side of, and in contact with, the cross ties.

The old rails are then continuously removed onto equipment carried on the new rails of standard gauge. This is accomplished by pulling the old rails while individual strands are still connected until the full length has been loaded and then unjointing the rails and repeating the operation. This pulling of the old rails is performed by the rail pusher used in threading the new rails to narrow gauge but by operating the rail pusher in reverse to pull the old rails across the ties and up onto the rail carts.

As a final step, the new rails are then oiled by a rail sprayer operating on the standard gauge, the oil serving to prevent corrosion of the rails.

Now that the rail removal process has been described in detail, the individual equipment utilized to perform the process will be described.

Paint striper

Figure 3:
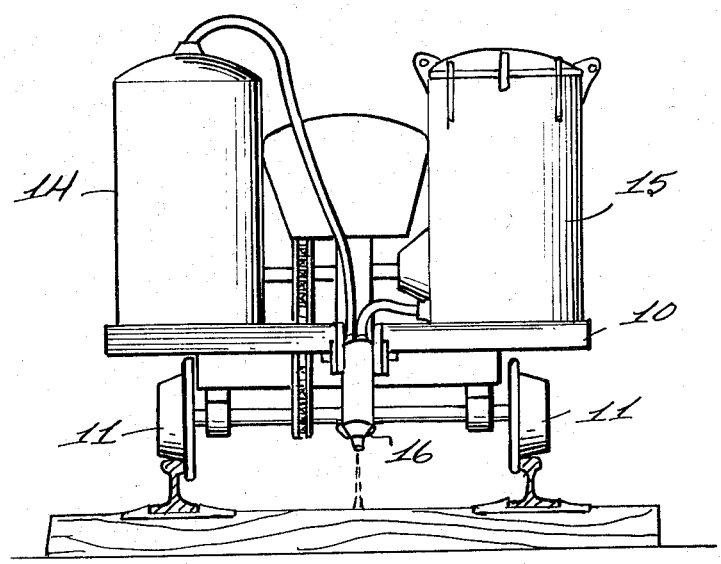
FIGURE 3 is an end elevation view of the line painting machine shown in FIGURE 2.

In FIGURES 2 and 3 there is illustrated an exemplary embodiment of a line painting machine which scribes a center line on cross ties longitudinally of the standard gauge track from which the gauging of the new track is established.

The paint striper comprises a flat bed support platform 10 appropriately mounted on rail wheels 11 having a width corresponding to standard gauge so that the line painting machine may operate on the existing standard gauge track. Mounted on the flat bed is an engine 12 which allows the railway motor car to be self-propelled along the track. The drive shaft of the engine is also suitably joined to a compressor 13 which, in turn, is interconnected with a pressure tank 14. A paint tank 15 is also mounted on the flat bed. Both the pressure tank 14 and the paint tank 15 are suitably connected to a spray nozzle 16 mounted just above the rail ties and accurately positioned such that the spray from the nozzle will contact the cross ties midway between the existing standard gauge rails. Suitable means are provided for actuating the nozzle such that pressure is applied from tank 14 to force paint from paint tank 15 through nozzle 16 to scribe a mark on the cross ties midway between the rails to be replaced.

Narrow gauge cradle

The device which is utilized to temporarily support the two new rails at a narrow gauge between the existing rails and above the cross ties is illustrated in FIGURES 4 and 5. This narrow gauge cradle is placed on a cross tie at intervals of approximately ten cross ties along the track. When positioned on the track, the cradle is centered on the stripe which has been painted on the cross tie by the paint striper. The accuracy of centering of the cradle is insured by means of indicators 21 attached to the cradle. The position of the cradle on the cross tie is held by means of a plurality of teeth 22 which penetrate the top surface of the cross tie. The frame member which constitutes the body of the cradle is provided with shoulders 23 which define recesses on opposite sides of the cradle. When the new rails are threaded to the narrow gauge, the inner flanges of these rails rest against shoulders 23 and the outer flanges of the new rails rest against latches 24 pivotally connected to the ends of the cradle frame. In FIGURE 4, one of the latches 24 is shown in its upright position where it is locked by slotted hinges 25 which allows the lower ears 26 of the latches to drop between the two end bars 27 thereby preventing overturning of the latches and holding the rail to gauge.

To lower the latch to the position of the other latch shown in FIGURE 4, the latch 24 is raised to permit the slotted hinges 25 to raise the ears 26 free of the end bars 27. The latch is then free to rotate to the position shown wherein it serves as a ramp to guide transverse motion of the new rail onto a tie plate when the new rail is spread from narrow gauge to standard gauge during the rail removal process. Lugs 28 on the latches contact the outer surface of the shoulder of the tie plate when the latch is rotated to its down position in this operation enabling accurate placement of the rail on the tie plate when it is spread from the narrow gauge to standard gauge position.

Rail Pusher

The rail pusher for laying the new rails from the rail cars and pulling up the old rails onto these rail cars is illustrated in the flow diagram of FIGURES 1A and 1B. This arrangement in its simplest form comprises pairs of cooperating endless conveyors which are mounted on the flat bed of a rail pusher car. Two pair of conveyor elements are shown. This provides a capability of pushing or pulling two strands of rail simultaneously or separately. These conveyors are connected to a reversible drive source (not shown). When a rail is being withdrawn from the rail cars or placed thereon, it is threaded between the cooperating conveyor elements, and the drive source is actuated to appropriately push or pull the rail.

Rail guide cart

Figure 6:
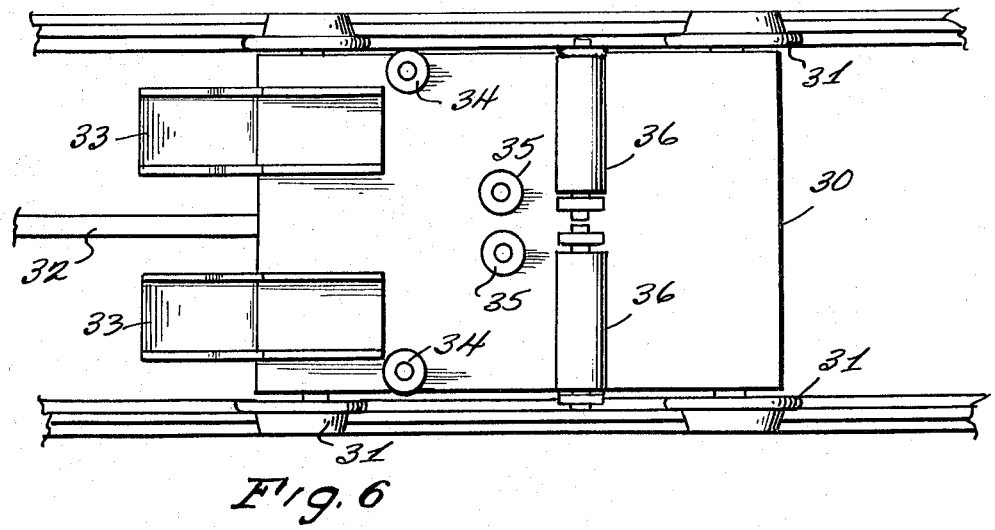
FIGURE 6 is a top plan view of the rail guide cart.
Figure 7:
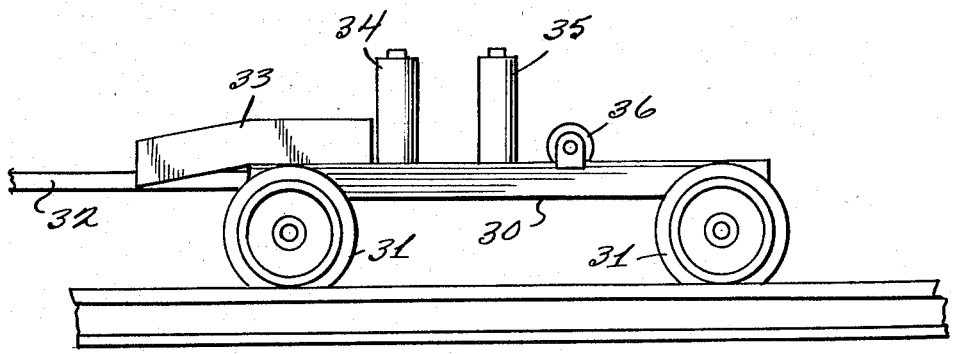
FIGURE 7 is a side elevation view of the rail guide cart shown in FIGURE 6.

The device for insuring that the new rail pushed from the rail cars is properly directed to the recesses at narrow gauge in the cradles heretofore described is illustrated in FIGURES 6 and 7.

This rail guide cart, or rail dolly, comprises a flat-bed 30 mounted on rail wheel assemblies 31 of standard gauge. The cart is connected to the rail pusher car of the work train to be propelled thereby, by means of a coupler bar 32.

Mounted on the flat-bed are a pair of spaced U-shaped guides 33, each of which comprises a pair of parallel upwardly directed flange elements interconnected by a web. A new strand of rail is directed by each of the guides to vertical roller arrangements associated with each guide 33, each arrangement comprising staggered rollers 34 and 35 positioned to contact opposite sides of the rail as it passes between the vertical rollers, thereby directing the rail over an associated horizontal roller 36, mounted on the flat-bed, to the appropriate narrow gauge cradle recess.

Rail drill, rail saw, carrier car and spike pullers

The units utilized to drill and saw the rail, the carrier car for transporting the spike pullers, and the spike pullers themselves may be of any conventional type. Accordingly, these units are shown only generally in the flow diagram of FIGURES 1 and 2.

Wide gauge tie plates

The steel tie plates placed at intervals along the track to support the old rails after they have been spread out to their wide gauge position are shown in FIGURES 8 and 9, FIGURE 9 illustrating in dash lines the positioning of a rail on the tie plate.

Each tie plate comprises a perforated plate element 40, having an upper surface of triangularly shaped lugs 41 between which the flanges of the old rails rest when moved to the wide gauge position. On the lower surface of plate 40 is a plurality of pins or teeth 42 which penetrate the upper surface of the cross tie thus preventing transverse shifting of the plates and of the old rails. The purpose of providing perforations 43 in plate 40 is to reduce the weight of the tie plate.

Conveyor salvage car

The structure utilized in storing the rail anchors and spikes which have been removed from the existing rail is shown in FIGURES 10 and 11. The scrap loader comprises inclined conveyors 51 and 52 mounted on the flat bed of a rail car. Also positioned on a rail car attached to that on which the inclined conveyors are positioned are tiltable bins 53. Both of the rail cars are mounted on rail wheels suitable for travel on standard gauge rails. One of the conveyors is utilized to handle the rail anchors directing them into one of the bins 53, and the other conveyor directs the spikes into the other bin.

As stated previously, the conveyor salvage car is coupled ahead of and to the cribber brush machine and the wide gauge threader, the latter being the propelling source. The interconnection of these elements is such that forward motion of the machines operates the belts of the inclined conveyors rearwardly. This is accomplished by connecting the axle of the front wheels 54 of the conveyor rail car by a sprocket gear and roller chain to a gear box which is connected to the drive shafts for the conveyor belts 55. A slip clutch arrangement is provided to permit the conveyor belts to move in only one direction, that being rearward. Means are also provided for operating the conveyor at a convenient speed and for setting the gear box in the neutral position for travel.

At the lower ends of the conveyors 51 and 52 are positioned flared hoppers 56 to facilitate the placement of rail anchors or spikes on the appropriate belts. A chute 57 is provided at the upper end of the longer conveyor 52 to enable the material handled to fall well into the bin 53.

In normal operation each bin is retained in a normal upright position on its transverse studded track 58 by a clasp 59 and bar 60 as illustrated in FIGURE 11. When it is desired to empty the bin, the machine is halted and a hold-down hook 61 is rotated to engage the underside of the rail flange and an auxiliary hook 62 engages the underside of the ball of the rail. The clasp 59 is then released permitting the bin to roll on its arcs 63 whose holes are spaced to match the stud 64 until stopped by bar 60 in a tilted position. After the bin is emptied, it is rolled back to its upright position, the clasp 59 engaged and the hold-down hook 61 and auxiliary hook 62 disengaged from the rail and secured, as shown in FIGURE 11. The bin is then again ready to receive material as the machine is moved forward.

Cribber brush machine

The structure for this machine, which sweeps outward the ballast between the cross ties outside of the existing rails and which sweeps clean the cross tie ends on which the old rails are to be set at wide gauge, is illustrated in FIGURES 12 and 13.

The cribber brush machine, or tie end sweeper, comprises brooms consisting of flared steel cable edges 71 which are attached to shafts 72 rotatable to move the ballast outwardly. Sprocket gears attached to shafts 72 and 73 are connected by roller chains covered by shield 74. Shafts 73 are directly connected to and driven from gear boxes 75 which, in turn, are connected to and driven by multiple grooved wheels 76. These wheels 76 are operatively connected to a gasoline powered engine 78 by multiple belts 77. Engine 78 also drives a pump, the source of oil-hydraulic pressure for oil-hydraulic cylinder 79 suspended from cross frame 86. The pistons of the oil-hydraulic cylinders raise or lower side frames 80, on which are mounted the assembly of brooms, shafts 72, and protective covers 81 and 82. The side frames 80 rotate on shafts 73 as pivots. Cover 81 is attached to side frames 80 and cover 82 is attached to cover 81 by hinge 83, enabling cover 82 to swing out of the way for clearance or for replacement of steel cable ends 71.

This apparatus is mounted on a two axle cart 84 with wheels 85 set at standard gauge. The front of this cart is coupled to the rear end of the conveyor salvage car and the rear end is coupled by a long bar to the wide gauge threader which serves as a propelling source.

Wide gauge threader

The machine for moving the old rails from standard gauge to wide gauge is illustrated in FIGURES 14–17. This machine is self-propelled either on old rails at standard gauge or on new rails on narrow gauge, and functions on the new rails at narrow gauge in lifting extended lengths of old rails to spread them out to the ends of the cross ties at wide gauge. Coincidental with this operation, the machine by means of electromagnets, hydraulic and pneumatic cylinders lifts the old standard gauge tie plates off the cross ties, transports them horizontally beyond the ends of the cross ties and outside the old rails now at wide gauge, and then drops them.

Referring more specifically to the drawings, the machine travels with conventional single flanged wheels 91 on standard gauge track, as shown in FIGURE 14. When the single flanged wheels are down in travel position, holes in gears 92 attached to the frames are aligned so that when pins are inserted they take the full weight. In preparing for operation, the pins are removed and by means of oil-hydraulic cylinder 93 in the main frame 94 of the machine, these single flanged wheels 91 and their supporting frame 95 are raised relative to the main frame 94, thus lowering the main frame 94 and double flanged wheels 96 onto the new rails at narrow gauge where the machine normally functions.

The arrangement of the oil-hydraulic cylinder is such that one pair of single flanged wheels 91 may, by oil-hydraulic cylinders, be raised or lowered to some extent independently of the other pair, thus allowing considerably more vertical movement at the double flanged wheels 96 which are nearer to the ends of the machine for setting these wheels on the new rails at narrow gauge in the transfer from old rails at standard gauge.

After the machine is placed on "new" rails at narrow gauge, it is positioned so that the "old" rails at standard gauge may be lifted and moved outward, from the center where they are aligned for the threaders 97, FIGURE 14, to pass under and support them as the machine moves forward. This alignment is accomplished by means of openable rolling clamps 98, FIGURES 14 and 16, one for each rail, which can be moved longitudinally along the rail. The rollers 99 of these clamps contact the undersides of the heads of the "old" rails. A ring 100, FIGURE 16, is slid downward into position preventing the clamps from opening. The clamp is suspended from a rolling carriage 101 attached to the piston rod of an oil-hydraulic cylinder 102, all of which operates within two structural steel channels 103 (with flanges in) which are mounted transversely on the machine, being pivoted at 103-A, and which may be moved in a vertical plane by being connected to the piston rod of an oil-hydraulic cylinder 104. Various positions of the "old" rails, from rest in the standard gauge tie plates 105 to a raised position above the wide gauge tie plates 106, are shown in FIGURE 16.

The "old" rail at standard gauge is first guided into the threader 97 by the rolling clamp 98 previously described. A duplicate threader is mounted at the opposite end of structural steel channels, but is not shown here. After the threader 97 is rolled under and supports the "old" rail, the rolling clamp is disengaged by sliding the ring 100, FIGURE 16, upward and opening the clamp, and the whole lifted out of the way. Forward motion of the whole wide gauge threader now causes the "old" rail to be lifted from the tie plates at standard gauge 105, to be spread outward, and to be laid on the ends of the cross ties and on the wide gauge tie plates 106 which have been placed. Rollers support the "old" rail and additional rollers guide it horizontally. The weight of the rail and threader is supported by a plate to which the latter is attached. This plate is supported by a bolt passing through it, and through slotted holes in structural steel channels (with flanges out), and through holes in plates whose position transverse to the track is adjustable by means of the piston of an oil-hydraulic cylinder, the oil-hydraulic cylinder being connected to a bracket and the piston rod being connected to the plates. On a curve the "old" rails are swung to the outside as they are being threaded out to wide gauge. Plates attached to the top surface of the threader 97 are in sliding contact with the underside of the structural steel channels. These plates resist both longitudinal and transverse forces and motions, caused by the forward motion of the machine and the vertical and transverse forces caused by the transfer of the rail. The structural steel channels are connected to the piston rod of an oil-hydraulic cylinder, connected to the machine frame 94, by which they are moved vertically between the members of the frame. When the threader is to be out of operation for extended periods of time, it is disengaged from the rail and the whole asembly is lifted by oil-hydraulic cylinder and supported by heavy pins inserted in holes in the ears attached both to the frame 94 and the structural steel channels.

If the threader is to be disengaged from the "old" rail prior to completing transfer of the whole extended rail length from standard gauge position to wide gauge position, a pin can be withdrawn enabling the one side and its attached roller to be swung away from the "old" rail.

FIGURE 17 is a view of the portion of the machine which removes the "old" tie plates. An assembly of direct-current operated electromagnets 121 is energized, attracts, and holds a plurality of tie plates 105, is lifted by the piston of an oil-hydraulic cylinder 122 which is mounted upon a carriage 127 whose attached rollers 128 move along the flanges of channels 129 attached to the main frame 94. The carriage 127 is attached to the piston of a pneumatic cylinder 123. The whole assembly, electromagnets with their load of tie plates, carriage and a hydraulic cylinder, is moved transversely outward by pneumatic cylinder 123, the tie plates are dropped when the electromagnets are de-energized, and the electromagnets and oil-hydraulic cylinder are returned to their normal positions—the oil-hydraulic cylinder being in close and the electromagnets being raised.

By means of relay switches and timing devices in the panel box 124, FIGURE 14, and by means of limit switches 125, FIGURE 17, actuated by projecting arms 126, this assembly of electromagnets will continually function in the cycle above described until the control-handle is moved to the position which returns the cylinders and the electromagnets to their normal positions as above described.

Mounted on the front end is a winch 130, FIGURE 14, which is primarily used with quadruple blocks and tackle for pulling together and jointing of "new" rail lengths at narrow gauge.

*Wide gauge threader trailer*

The wide gauge cart, or threader trailer, utilized to gauge the old rails at the wide gauge for use as a second service track is illustrated in FIGURES 18 and 19. This cart, or trailer, operates on the new rails at narrow gauge to set the old rails to the proper wide gauge. The threader is coupled to the rail of the wide gauge threader by a beam 141 which is hollow in cross section. The threader has two push car type axles with single flanged wheels 142 at standard gauge for travelling. The cart normally functions on narrow gauge new rails on double flanged rollers 143, each attached to a vertical shaft 144 moved by a screw jack assembly 145, the screw being turned manually by crank 146. Continued forcing of the double flanged rollers 143 downwardly onto the new rails at narrow gauge raises the whole machine above the level of the rails at standard gauge. Forcing the top flange rollers downwardly onto the old rails at wide gauge forces these rails into alignment with respect to the new rails at narrow gauge as the threader is positioned by the wide gauge threader. Horizontal adjustments are made by turning any of cranks 148 attached to the screw jacks 149 which move the horizontal beam ends 150 inside fixed sleeves 151.

The wide gauge threader trailer also carries an electric welding machine driven by a gasoline engine. This machine is enclosed by a cover 152. The inclusion of this welding machine enables repairs or changes requiring welding to be made on the road.

The threader also houses oxyacetylene gas cylinders, torches, hoses, etc. within the inclined covered box 153. This equipment also affords the facility of being able to repair or make changs requiring flame cutting.

*Plug setting machine, pulling unit and plug setting machine, trailer unit*

The pulling unit for drawing the trailer portion of the plug setting machine may be a conventional propulsion arrangement mounted on a flat bed on rail wheels operating on narrow gauge rails. For convenience of illustration, this unit has been omitted from the drawings.

The trailer unit is illustrated in the flow diagram of FIGURES 1A and 1B. This unit also functions on rails at narrow gauge. In the trailer are two low-slung seats, one over each line of tie plate seats on the cross ties. From these seats operators may place wooden plugs into the old spike holes in the cross ties. A laborer follows each plug setter, driving the plugs flush with a hand tamper.

Dual cribber adzer creosoter

This self-propelled machine, shown in the flow diagram of FIGURES 1A and 1B, moves and functions on the cross ties by means of treads, being guided on the rails at narrow gauge by means of double flanged wheels. It travels on wheels at standard gauge.

The apparatus may be of any known construction. In the embodiment shown, the machine includes broomed cable-ends which brush out the ballast from the cribs in the vicinity of the tie plate seats on the cross ties. By means of circular plate cutters mounted at the ends of whirling horizontal radial arms, the plane of the cutters being vertical and radial, fresh seats are adzed in the cross ties; and then creosote is applied automatically to these fresh surfaces.

Plate lining trowel

The device used to align tie plates which have been placed on freshly adzed surfaces of the cross ties in preparation for receiving the extended lengths of new rail as it is slid from narrow to standard gauge, is illustrated in FIGURES 20 and 21.

The trowel-like device comprises a base portion 161 which rides in the rail seat portion of the tie plate, as shown in FIGURE 21, a handle 162 and arms 163, the outer ends of which are shaped to fit over the flange of the rail. By placing the base 161 in the rail seat portion of the tie plate and moving the tie plate until the notch at the outer ends of arms 163 is in contact with the flange of the new rail, as shown in FIGURE 21, each tie plate will be lined up a fixed distance from the new rail.

Standard gauge threader

The machine which slides the new rails from their narrow gauge position on the opened cradles onto the new tie plates is illustrated in FIGURES 22 and 23. This is a self-propelled machine travelling on rails of standard gauge and functioning on old rails at wide gauge.

In FIGURE 22, the single flanged wheels 171 for standard gauge travel and their mountings 172 are shown retracted by the pistons of the oil-hydraulic cylinder 173. This allows the double flanged wheels 174, shown in FIGURE 23, attached to the main frame 172, to roll into the operating position on rails at wide gauge. Rollers 175 in contact with the outside of the head of the rail at wide gauge are attached to the frame 176 by brackets 177. These rollers 175 provide resistance, in addition to that from the double flanged wheels 174, to meet the thrusts resulting from the sliding out of the new rail at narrow gauge by the double flanged rollers 178.

In FIGURES 22 and 23, the cradle 179 is shown in its open position with latch 180 down to enable the new rail to slide from the cradle to the tie plate 181. In order to permit the standard gauge threader to operate in this manner, all narrow gauge cradles must be opened in advance of the operation of this machine.

The double flanged rollers 178, as shown in FIGURE 23, is mounted on a carriage 182 with rollers 183 which travel within the flanges of channels 184 by reason of the carriage 182 being connected to the piston rod of an oil-hydraulic cylinder 185, also attached to the channels 184. These channels, which are approximately horizontal in their operating position, are pivoted at 186 and the whole assembly oil-hydraulic cylinder 185, channels 184, carriage 182, rollers 183, and double flanged rollers 178, are all moved vertically by being connected at 187 to the piston rod of an oil-hydraulic cylinder 188 suspended from the frame 176A on the side of the machine opposite from the pivot 186. Thus, the double flanged roller 178 may be moved both vertically and horizontally. A double flanged roller for the other rail is mounted in a similar manner by some supports and pivots oppositely arranged.

The operator causes the two double flanged rollers 178 at the front of the machine to be lowered onto the new rails at narrow gauge and then moved horizontally outward from the center of the track part of the distance to their standard gauge position. The positions of these front double flanged rollers is then fixed. The two double flanged rollers 178 at the rear of the machine are then lowered onto the new rails which are moved horizontally the remaining distance to their standard gauge position on the tie plates. The positions of these rear double flanged rollers are then fixed. As the whole machine proceeds forward, the track rails are continuously spread from the narrow gauge position to the standard gauge position.

In the operating position with the double flanged rollers 178 rigidly set relative to the frame 176, irregularities may develop in the surface of the new rail which would tend to lift one corner of the machine and derail it unless a cushioning effect is provided.

The oil-hydraulic cylinders 188A, FIGURE 22, at the rear of the machine are similar to those at the front, but have a somewhat different support 176B. A fluid duct arrangement to the cylinders 188A has a T-connection which enables the oil unit pressure in the rod end of cylinder 191 to be equal to that in the piston end of cylinder 188A, oil being incompressible for all practical purposes. Air under pressure has been brought to the piston side of cylinder 191 through a fluid duct from an air reservoir tank 193 (FIGURE 22). Thus, the two rear double flanged rollers 178 are in effect air cushioned in their vertical movements.

Mounted on the front ends is a winch 194 which is primarily used with quadruple blocks and tackle for the pulling together and jointing of new rail lengths.

Half gauge indicator

Figure 24:
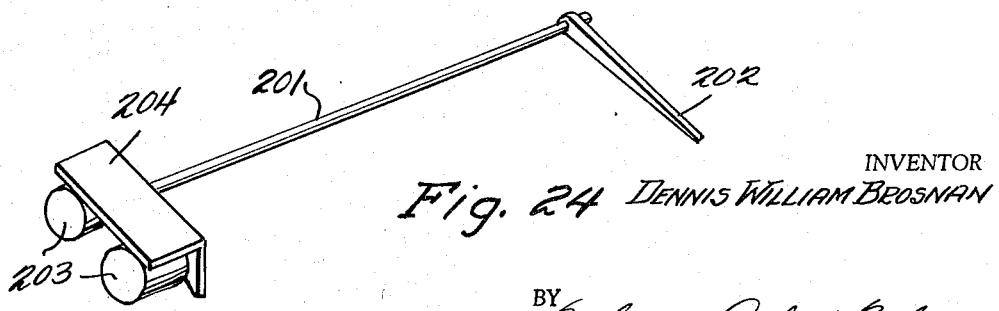
FIGURE 24 is a perspective view of the half-gauge indicator.

The gauge for properly aligning one of the new rails with respect to the painted center strip on the cross ties is illustrated in FIGURE 24. This device consists of a tube 201 having a pointer 202 attached at one end and a permanent magnet 203 in a housing 204 attached to the other end of the tube.

The distance "D" from the pointer 202 to the face of a magnet 203 is made equal to the distance from the center line of track to the inner (i.e., gauge side) edge of the base of the rail.

In operation the device is placed so that the face of the magnet contacts the inner edge of the rail base, and the pointer 202 rests on the cross tie upon which the track center line strip has been painted. The rail and tie plates are shifted so that the pointer coincides with the center line strip and then gauge spikes are driven in every eighth cross tie. This is sufficient to hold the alignment until further gauging and spiking is accomplished.

Standard gauge threader trailer

The device which sets the new rails parallel after they have been spread from narrow gauge to standard gauge by the standard gauge threader is shown in FIGURES 25 and 26. This trailer is coupled to the standard gauge threader by means of a beam 211, as shown.

The trailer has two push cart type axles with single flanged wheels 212 at standard gauge for travel.

Ordinarily the machine functions on rails at standard gauge on double flanged rollers 217, FIGURE 26, and single flanged wheels 212, FIGURES 25 and 26. The double flanged rollers 217 are mounted and function in the same manner as do the double flanged rollers 213 described hereinafter.

On curves this machine may function also on old rails at wide gauge on double flanged rollers 213 each attached by a vertical shaft 214 moved by a screw jack assembly 215, the screw being turned by an oil-hydraulic motor 216. Forcing of the double flanged rollers 213 downwardly onto the old rails at wide gauge and forcing of the double flanged rollers 217 downwardly onto the new rails at standard gauge will force the latter rails and tie plates into proper alignment at standard gauge as this trailer is pulled forward by the standard gauge threader. Horizontal adjustments are made by turning any of the cranks 218 attached to the screw jacks 219 which move the horizontal beam ends 220 inside the sleeves 221.

Vertical movements of all double flanged rollers are controlled from the standard gauge threader by oil-hydraulic valves connected to the oil-hydraulic motors of this machine by flexible fluid ducts.

Mounted on this machine are a storage compartment 222 in which spare parts and supplies may be locked and an air compressor 223 with reservoir tanks 224.

*Gauger, liner, spiking machine (spot spiker)*

Figure 27:
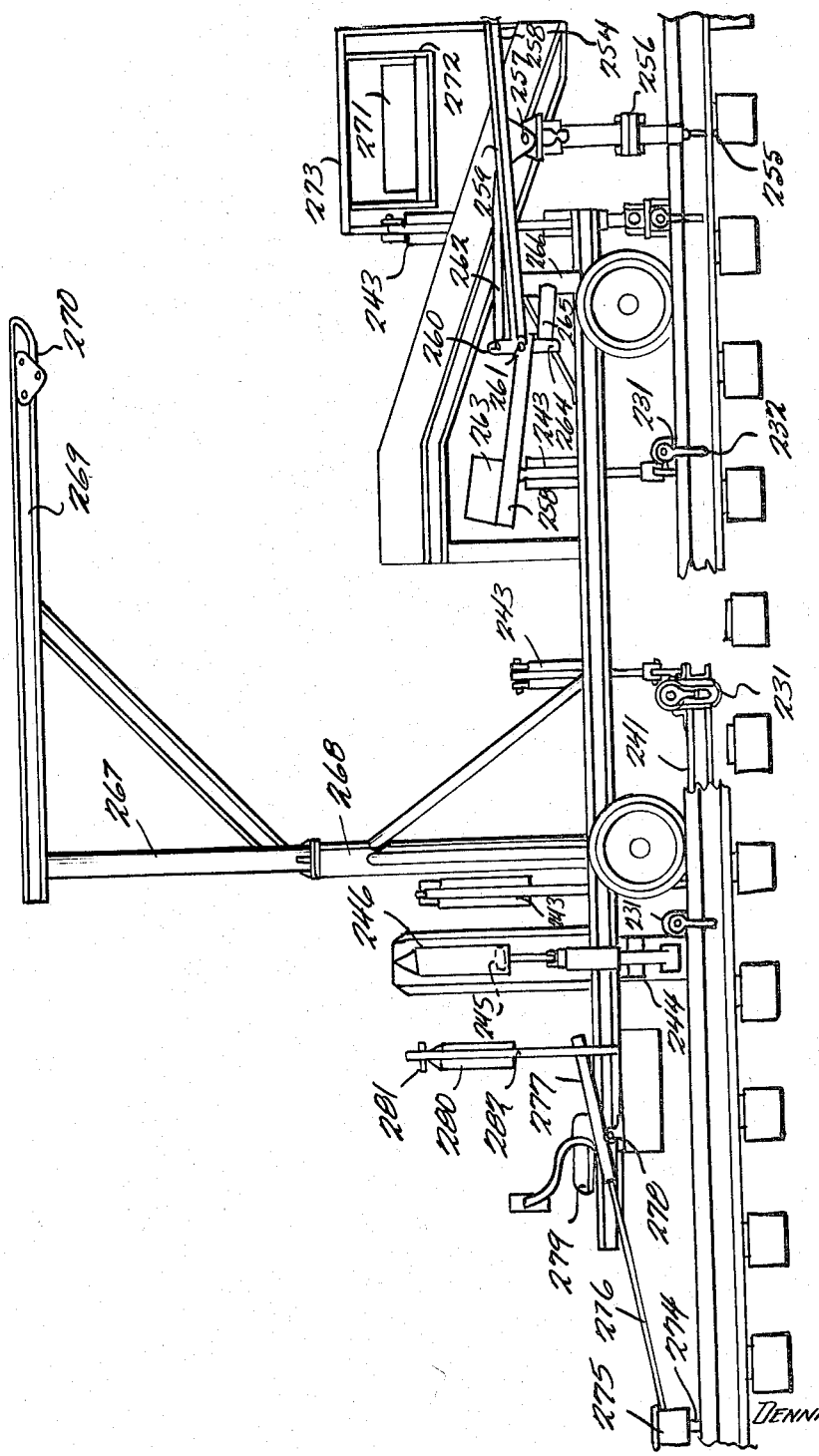
FIGURE 27 is a side elevation view of the gauger liner-spot spiker, or gauging spiker.

The apparatus for bringing the remaining new rail into gauge and holding it while every fourth cross tie is spiked for both of the new rails is illustrated in FIGURE 27. This machine travels and functions on rails at standard gauge. It is a free rolling unit being coupled to and pushed by a propelling unit, to be hereinafter described, which is the source of both pneumatic and oil-hydraulic pressure.

The rails are grasped and held tight against the gauging heads 231 by clamps 232 and rods actuated by separate oil-hydraulic cylinders. The cylinder associated with clamps has two pistons and associated piston rods. When oil-hydraulic pressure is introduced to the rod ends of this cylinder, the clamps 232 close tightly against the outside of the rail webs. When oil-hydraulic pressure is introduced between the pistons, the clamps 232 release their hold on the outside of the rail webs.

The cylinder associated with the rods has a single piston. When oil-hydraulic pressure is introduced in the piston end, rods move outwardly until their ends contact the inside of the rail webs. When oil-hydraulic pressure is introduced in the piston rod end of the cylinder, one of the rods will move inwardly away from the rails until a collar thereon contacts a stop, the other rod continuing its inward travel until it contacts another stop.

Gauging heads 231 are held perpendicular to the track by being attached to four-sided frames, part of one being shown at 241. Gauging heads and frames are raised and lowered by the pistons of pneumatic cylinders 243 mounted on the center line of the machine.

Gauging head 231 is attached to lining head 244. This whole assembly is raised and lowered by the pistons 245 of pneumatic cylinders 246.

After all clamps and rods have grasped the rails and are holding them tight against the gauging heads, the rails and tie plates may be centered over the stripe painted on the cross ties. This is accomplished by the piston of a trunnion-mounted, pivotal oil-hydraulic cylinder with a foot plate attached to the end of its piston rod.

The position of the piston of another pneumatic cylinder determines the inclined position of the pivotal oil-hydraulic cylinder, which comes to rest against either of stops that are integral parts of the lining head.

In the extended position of this other cylinder, the rails which are clamped to gauge, and the tie plates, have been thrust to the right on the cross ties, since the piston of the pivotal cylinder has pushed the foot plate in the downward inclined direction to the left against the ballast, thus lifting and thrusting to the right the machine with the rails clamped to it at gauge.

If a thrust to the left is required, both pistons are moved inwardly raising the foot plate and inclining the pivotal oil-hydraulic cylinder to the left. Oil pressure now applied to the piston side of this cylinder will thrust the foot plate in the downwardly inclined direction to the right against the ballast, thus lifting and thrusting the machine to the left.

An indicator shows the position of the machine, the clamped rails and the tie plates relative to the center line stripe. When the indicator and the center line stripe coincide, the pneumatic hammer operators take spikes from the spike tray 254, dip them in liquid resin in a heated pot 271 and place them in gauge holes of the tie plates for each fourth cross tie as at 255. The quick-setting resin holds the spikes upright as placed, but it quickly shatters as the pneumatic hammer 256 begins to drive the spikes.

At the rear of the machine is the resin pot 271, attached to a heating unit 272 suspended from a support 273, attached at the forward end to the frame supporting the rear pneumatic cylinder 243 and at the rear to the rear-end of the spike tray 254.

Each pneumatic hammer 256 is mounted on a horizontal shaft 257 in the handle assembly 258. The pneumatic hammer is kept in a vertical position by means of a pantograph arrangement. Horizontal shafts 260 and 261 have the same center-to-center distance as 259 and 257, and by means of rod 262, the distance center-to-center of horizontal shafts 259 and 260 is kept equal to that between shafts 257 and 261. The pneumatic hammer 256 and handle assembly are balanced about horizontal shaft 261 by means of a lead counterweight 263.

Horizontal shaft 261 is mounted on a freely rotating, vertical shaft 264, in a vertical sleeve, at the end of arm 265, attached to a vertical sleeve 266 which is free to rotate about a vertical shaft fixed to the frame of the machine. Thus the pneumatic hammer 256 is free to swing not only transversely to the rail but also along the rail a distance equal to the projection along the rail of the arc through which vertical shaft 264 swings with arm 265 as a radius, the pneumatic hammer being vertical throughout these motions.

After the rails are clamped to gauge by this machine, gauge spikes are to be driven by the pneumatic hammer operators at every fourth cross tie, thus "spot spiking" the track. The clamps 232 are then released and this machine together with machines hereinafter described which are coupled to it, move forward four tie spaces to the next "spot."

To facilitate this advance by increments of four tie spaces, a spot is painted on top of one rail with a wick 274, FIGURE 27, which protrudes from the bottom of a small paint pot 275, attached to a vertically movable rod 276. Its distance in front of the machine is adjusted by varying its setting in a tube 277 which is pivoted at 278 near the machine operator's seat 279. Tube 277 is connected to the piston rod of pneumatic cylinder 280, mounted at 281 in its supporting frame 282, so that it has the needed freedom to swing longitudinally as tube 277 is raised and lowered. The pneumatic valves controlling pneumatic cylinder 280 are interconnected with those controlling the air brakes so that paint pot 275 is raised before the brakes are released and lowered after the brakes are set.

A hoisting arrangement, for loading kegs of spikes to replenish the supply in the spike tray 254, consists of the tubular mast 267 free to rotate inside its tubular mounting 268. On the braced arm 269, a trolley 270 is free to roll. From the latter is suspended an air-driven chain hoist (not shown).

*Gauger, liner, spiking machine (air compressor)*

This machine is a source of locomotion, oil-hydraulic and pneumatic pressure for the spot spiker just described and the multiple spiker set forth in detail hereinafter. It also carries a container for liquified gas for heating resin pots used in association with the spiking operation.

For convenience of illustration, this machine has not been included in the flow diagram of FIGURES 1A and 1B.

The machine generally comprises an air compressor and an air tank mounted on a chassis. A frame constructed of steel channel sections is attached to rear railway wheels at standard gauge. This frame is attached to the chassis and is rotatable to a limited extent about a longitudinal axis allowing the rear axle and wheels to tilt independently of the front axle and wheels connected to the chassis thus avoiding derailments which may be caused by wheels and axles being rigidly attached to the same frame as the vehicle rolls on uneven track.

As stated previously this machine is a source of propulsion for both the spot spiker and the multiple spiker, being joined to each by coupling bars.

*Gauger, liner, spiking machine (multiple spiker)*

Figure 28:
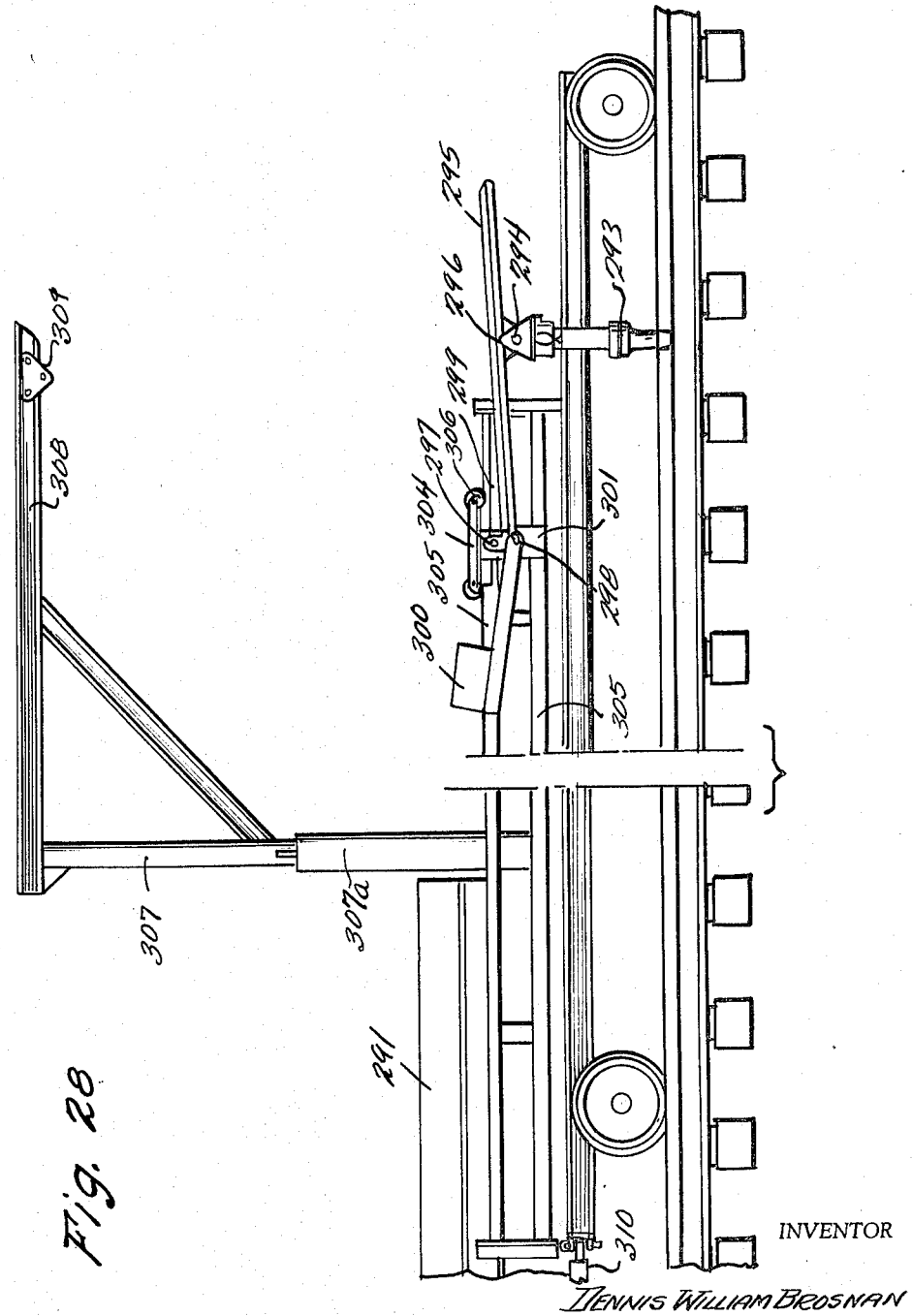
FIGURE 28 is a side elevation view of the gauger liner multiple spiker, or rail laying auto-spiker.

This structure, shown in FIGURE 28, is utilized to finish the spiking operation by which the new rails are completely spiked at the standard gauge. The machine is a free rolling unit being coupled to and towed by the gauger, liner, spiking machine (air compressor) which is a source of both pneumatic and air hydraulic pressure for the multiple spiker. This machine travels and functions on rails at standard gauge.

The long coupling bar 310 serves not only to connect the multiple spiker to the compressor but also to carry two resin pots, heaters, and a long tray for spikes. Laborers on each side of the tray take spikes, dip them in liquid resin and place them in the gauge holes of the tie plates remaining unspiked after the passage of the spot spiker. On curves, anchor spikes are placed in this same manner.

The quick-setting resin holds the spikes upright as placed but quickly shatters as the pneumatic hammers 293 begin to drive the spikes. Two pneumatic hammers are operated on each side. (Only one is shown in FIGURE 28.)

Each pneumatic hammer 293 is mounted on a horizontal shaft 294 in the handle assembly 295. The pneumatic hammer is kept in a vertical position by means of a pantograph arrangement. Horizontal shafts 297 and 298 have the same center-to-center distance as 294 and 296, and by means of a rod 299, the distance center-to-center of the horizontal shafts 296 and 297 is kept equal to that between the shafts 294 and 298. The pneumatic hammer 293 and handle assembly 295 are balanced about horizontal shaft 298 by means of a lead counterweight 300.

Horizontal shaft 298 is mounted on a freely rotating, vertical shaft inside the vertical tubular mounting 301 fixed at the end of a tubular arm, attached by gusset plates to a rolling carriage 304: The latter has pairs of rollers which contact the inside and outside surfaces of square tubular side rails 305 and two top rollers 306 which contact the top sides of the upper square tubular side rail, and a single roller which contacts the underside of the lower square tubular side rail.

Carriage 304 consists of four structural steel angle sections, longitudinal to the machine—each upper and lower pair connected by transverse structural steel angle sections. Upper and lower sets are attached to a vertical structural steel channel section outside of the square tubular side rails 305. To the outer face of the vertical structural steel channel section is attached the tubular arm, the attachment being made directly and by gusset plates.

Eight rollers, with vertical shafts, are set in the four longitudinal structural steel angle sections. Two rollers 306 with horizontal shafts are set in the upper structural steel angle sections. Only one roller with a horizontal shaft is set in the lower structural steel angle sections. Upper and lower square tubular side rails are shown in these views as though carriage 304 were being mounted on them for the first time.

Thus the pneumatic hammer 293 is not only free to swing transversely to the rail but can be rolled along the rail a distance equal to the distance which carriage 304 can roll along the square tubular side rails 305. This allows the pneumatic hammer operators to progress at rates independent of the machine and of each other.

A hoisting arrangement, for loading kegs of spikes to the upper tray 291 consists of the tubular mast 307 free to rotate inside its tubular mounting 307a. On the braced arm 308 a trolley 309 is free to roll. From the latter is suspended an air driven chain hoist (not shown).

*Rail anchor cart and anchor machines*

The structures by which rail anchors are readily accessible for placement so that the following anchoring machines may anchor the new rail construction in place are shown generally in the flow diagram of FIGURES 1A and 1B. The self-propelled rail anchor cart comprises an inclined tray mounted on railway wheels of standard gauge. The cart is provided with a hoist to load bags of rail anchors into the tray. From this tray the anchors are manually hung on the new rail at standard gauge in preparation for the subsequent anchoring.

The anchoring machines themselves may be of the conventional type operative on rails at standard gauge to secure the anchors to the new rails.

*Rail sprayer*

Figure 29:
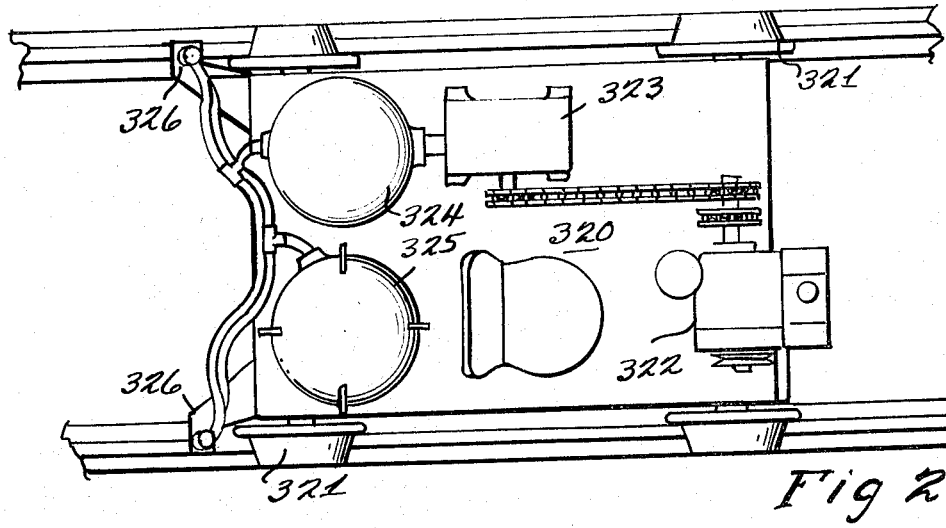
FIGURE 29 is a top plan view of the self-propelled rail sprayer.
Figure 30:
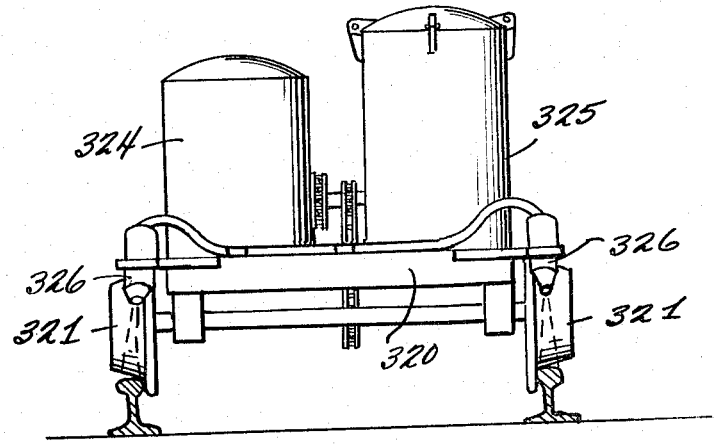
FIGURE 30 is an end elevation view of the rail sprayer shown in FIGURE 29.

An exemplary embodiment of the rail sprayer utilized to place a protective coating of oil on the new rails is illustrated in FIGURES 29 and 30. This structure is very similar to that described with reference to the paint striper illustrated in FIGURES 2 and 3. The structure comprises a flat bed 320 mounted on railway wheels 321 which travel on standard gauge track. Mounted on the flat bed is a gas-powered engine 322 which provides a source of propulsion for the rail sprayer. In addition, the drive shaft of the engine 322 is linked to a compressor 323. This compressor is associated with an air tank 324. On the flat bed there is also positioned an oil tank 325. The oil tank and the air tank are appropriately connected to nozzles 326 positioned immediately above the new rails at standard gauge. These nozzles are suitably actuated to permit the air to force a spray of oil onto the tracks thereby providing appropriate protection from corrosion.

The above described embodiment is illustrative of a preferred embodiment of the invention but is not intended to limit the possibilities for renewing rail by simultaneously laying new rail while removing old rail. While there have been shown and described the fundamental novel features of the invention, it will be understood that various omission and substitutions and changes in the form and details of the process and apparatus for implementing the process may be made by those skilled in the art without departing from the spirit of the invention. It is the intention, therefore, to be limited only as indicated by the scope of the following claims.

What is claimed is:

1. A method for replacing the rails on the existing ties of a track structure with continuous ribbon rails comprising the steps of: laying the new rails at a narrow gauge between the old rails of the standard gauge track to form a service track; removing spikes and rail anchors from the standard gauge track; cleaning the ends of the ties of the track structure outwardly of each of the rails of the standard gauge track; moving the old rails respectively outwardly onto the cleaned ends of the ties; gauging the old rails at a predetermined wide gauge to form a second service track; removing old tie plates and re-conditioning the surface of the ties in the areas of the removed old tie plates; installing new tie plates on the re-conditioned surfaces of the ties and gauging the position of the same from the rails of the narrow gauge service track; spreading the new rails from their narrow gauge position to a position on the tie plates; then gauging the new rails to standard gauge and spiking and anchoring the new rails to the ties; and then removing the old rails continuously onto equipment carried on the new rails of the standard gauge track.

2. A method of replacing the rails on the existing ties of a track structure with continuous ribbon rails comprising the steps of: laying the new rails at a narrow gauge between the old rails of the standard gauge track to form a service track; removing spikes and rail anchors from the standard gauge track; cleaning the ends of the ties of the track structure outwardly of each of the rails of the standard gauge track; moving the old rails respectively outwardly onto the cleaned ends of the ties; gauging the old rails to a predetermined wide gauge to form a second service track; removing old tie plates and re-conditioning the surface of the ties in the areas of the removed tie plates; installing new tie plates on the re-conditioned surface of the ties and gauging the position of the same from the rails of the narrow gauge service track; spreading the new rails from the narrow gauge position to a position on the tie plates; gauging and spiking one of the new rails and then gauging and spiking the other of the new rails with respect to the initially gauged and spiked new rail; and then removing the old rails continuously onto equipment carried on the new rails of standard gauge track.

3. A method of replacing the rails on existing ties of a track structure with continuous ribbon rails comprising the steps of: laying the new rails at a narrow gauge between the old rails of a standard gauge track to form a service track; cleaning the ends of the ties of the track structure outwardly of each of the old rails of the standard gauge track; moving the old rails of the standard gauge track respectively outwardly onto the cleaned ends of the ties by equipment supported on the narrow gauge service track and gauging the same to a predetermined wide gauge to form a second service track; re-conditioning the support surface of the ties in the areas where the old rails were removed; spreading the new rails from their narrow gauge position to a position on the re-conditioned surface of the ties by equipment supported on the wide gauge service track; gauging one of the new rails and spiking the same to the ties; and then gauging the second of the new rails to standard gauge from the spiked new rail and then spiking the second rail; and then removing the old rails continuously onto equipment carried on the new rails of the standard gauge track.

4. A method of replacing the rails on existing ties of a track structure with continuous ribbon rails comprising the steps of: laying the new rails at a narrow gauge between the old rails of a standard gauge track to form a service track; cleaning the ends of the ties of the track structure outwardly of each of the old rails of the standard gauge track; moving the old rails of standard gauge track respectively outwardly onto the cleaned ends of ties by equipment supported on the narrow gauge service track and gauging the same to a predetermined wide gauge to form a second service track; re-conditioning the support surface on the ties in the areas where the old rails were removed; spreading the new rails from their narrow gauge position to a position of slightly wider gauge than standard gauge on the re-conditioned surfaces of the ties by equipment supported on the wide gauge service track; gauging one of the new rails and spiking the same to the ties; and then gauging the other of the new rails to standard gauge from the spiked new rail by moving the other rail toward the spiked new rail and then spiking the other rail; and then removing the old rails continuously onto equipment carried on the new rails of the standard gauge track.

5. The method as claimed in claim 4 including the further step of oiling the new rails after they are set at a standard gauge.

6. The method as claimed in claim 4 wherein the step of removing the old rails onto equipment carried on the new rails of standard gauge track includes pulling the rails up onto the equipment while individual strands are still connected until the full length of the equipment has been loaded and then unjointing the rails and repeating the operation until all of the strands of old rails are racked onto the equipment supported on the standard gauge track.

7. The method as claimed in claim 4 wherein the step of re-conditioning the support surfaces of the ties in the areas where the old rails were removed includes the steps of first adzing the ties to provide a new bearing surface and then creosoting the adz surface of the ties.

8. The method as claimed in claim 7 including the step of cribbing the ballast between the ties in the area where the ties are to be re-conditioned to a depth greater than that required for adzing prior to the step of adzing.

9. A method of replacing the rails of existing ties on a track structure with continuous ribbon rails comprising: the steps of laying the new rails at a narrow gauge between the old rails of a standard gauge track to form a service track; cleaning the ends of the ties of the track structure outwardly of each of the old rails of standard gauge track; moving the old rails of the standard gauge track respectively outwardly onto the cleaned ends of the ties by equipment supported on the narrow gauge service track and gauging the same to a predetermined wide gauge to form a second service track; re-conditioning the support surface on the ties in the areas where the old rails were removed; spreading the new rails from their narrow gauge position to a position of slightly wider gauge than the standard gauge on the re-conditioned surfaces of the ties by equipment supported on the wide gauge service track; gauging one of the new rails and spot spiking the same to ties separated by a number of other ties; and then gauging the other of the new rails to standard gauge from the spiked new rail by moving the other rail toward the spiked new rail and then spot spiking the other rail to ties with a number of other ties therebetween; and then spiking both new rails to all of the ties; then removing the old rails continuously onto equipment carried on the new rails of the standard gauge track.

10. A method of replacing the rails of a standard gauge track on the existing ties of a track structure with continuous ribbon rails comprising the steps of: laying the new rails at a narrow gauge between the old rails of the standard gauge track and overlapping the ends of the rails of the standard gauge track to which the new rails will be jointed, the new rails at narrow gauge forming a service track; removing the spikes and rail anchors from the rails to be replaced of the standard gauge track by equipment travelling on the standard gauge track; cleaning the ends of the ties of the track structure outwardly of each of the rails of the standard gauge track by equipment travelling on the standard gauge; transferring spreading and gauging equipment from rails of the standard gauge track to which the new rails will be jointed onto the overlapping ends of the rails of the narrow gauge service track; unjointing the old rails of the standard gauge track from the rails of the standard gauge track to which the new rails will be jointed and spreading and gauging the old rails to a predetermined wide gauge to form a second service track; pulling the narrow gauge service track forward until the overlapping ends of the same are even with the ends of the rails of the standard gauge track to which it will be jointed; spreading the new rails from their narrow gauge position and jointing the ends of the same with the rails of the standard gauge track and then gauging the new rails to standard gauge by equipment travelling on the wide gauge service track; and then removing the old rails continuously onto equipment carried on the new rails of standaard gauge track.

11. The method as claimed in claim 10 including the steps of: re-conditioning the surface of the ties between the narrow gauge service track and the wide gauge service track prior to spreading the rails of the narrow gauge service track thereon to standard gauge.

12. The method as claimed in claim 11 including cribbing the ballast between the ties in the area where the ties are to be re-conditioned and then re-conditioning the ties by first adzing the surface of the ties and then creosoting the adzed surfaces.

13. The method as claimed in claim 10 including the step of transferring the equipment used on the narrow gauge service track and the wide gauge service track back to the standard gauge track and returning the same over the standard gauge track and then using the rail laying equipment to remove the old rails by pulling the end rails up onto the equipment while individual strands of the same are still connected until the full length of the equipment has been loaded and then unjointing the old rails and repeating the operation until all of the strands of the old rails are racked onto the equipment.

14. The method as claimed in claim 10 wherein the gauging of the new rails to standard gauge is accomplished by gauging one of the new rails and spiking the same to the ties and then subsequently gauging the other new rail from the first new rail and spiking it to the ties.

15. The method as claimed in claim 10 wherein the gauging of the new rails to standard gauge is accomplished by spreading the new rails to a gauge slightly greater than standard gauge, gauging one of the new rails and spiking the same to the ties and then subsequently gauging the other new rail from the first new rail by drawing the same toward the first new rail and then spiking it to the ties.

16. The method as claimed in claim 15 wherein the spiking of the new rails to the ties at the time of gauging is accomplished by spot spiking each of the new rails to ties with a number of ties therebetween; and then after both rails have been spot spiked, spiking both new rails to all of the ties and applying anchors to the new rails.

17. A method of replacing the rails of a standard gauge track on existing ties of a track structure with continuous ribbon rails comprising the steps of: scribing a mark on each of the ties longitudinally of the standard gauge track and midway between the old rails to be replaced, gauging the new rails from the marks on the ties to a narrow gauge, the new rails at narrow gauge forming a service track; spreading the old rails outwardly of the service track and gauging the old rails to a predetermined wide gauge by equipment riding on the narrow service track to form a wide gauge service track; spreading the new rails from their narrow gauge position to a position of substantially standard gauge by equipment riding on the wide gauge track; gauging the new rails with respect to the markings on the ties to standard gauge and spiking the same to the ties; then removing the old rails from the ties.

18. A method of replacing the rails of a standard gauge track on existing ties of a track structure with continuous ribbon rails comprising the steps of: scribing a mark on each of the ties longitudinally of the standard gauge track and midway between the old rails to be replaced; laying the new rails between the old rails; gauging the new rails from the marks on the ties to a narrow gauge, the new rails at narrow gauge forming a service track; spreading the old rails outwardly of the service track and gauging the old rails to a predetermined wide gauge by equipment riding on the narrow gauge service track to form a wide gauge service track; spreading the new rails from their narrow gauge position to a position slightly greater than standard gauge by equipment riding on the wide gauge track; gauging one of the new rails with respect to the marks on the ties and spiking the same to the ties; then gauging the other new rail with respect to the first new rail by pulling the other rail toward the new rail and spiking the same to the ties; then removing the old rails in continuous lengths from the ties.

19. The method as claimed in claim 18 wherein the old rails are removed from the ties by pulling the same up onto equipment carried on the standard gauge track.

20. The method as claimed in claim 18 including the step of cleaning the outer ends of the ties before the old rails are spread to wide gauge to thereby provide a temporary seat for the old rails.

21. The method as claimed in claim 18 including cribbing the ballast between the ties in the area between the narrow gauge service track and the wide gauge service track; and then reconditioning the surface of the ties in the area between the narrow gauge service track and the wide gauge service track.

22. The method as claimed in claim 21 wherein the step of re-conditioning the surfaces of the ties includes first adzing the surfaces of the ties to provide a new bearing surface and then creosoting the adzed surfaces.

23. The method as claimed in claim 18 including oiling the new rails after positioning the standard gauge.

24. The method as claimed in claim 18 wherein the scribing of the mark on each of the ties is accomplished by painting a stripe on each of the ties.

25. A method as claimed in claim 18 including removing tie plates after the old rails are spread to wide gauge and inserting new tie plates in their place and gauging said tie plates from the base flanges of the service track so that the tie plates are substantially in position to receive the new rails at standard gauge from their position of narrow gauge.

26. The method as claimed in claim 18 wherein the gauging of the new rails to narrow gauge from the marks on the ties is accomplished by placing cradles having rail base flange-receiving recesses therein spaced apart at the narrow gauge on spaced ties aligning a reference mark on each of the cradles with the mark on the ties.

27. A method of replacing rails of a standard gauge track on existing ties of a track structure with continuous lengths of ribbon rails racked on rail cars comprising the steps of: painting a reference stripe on each of the ties longitudinally of the standard gauge track midway between the old rails to be replaced by equipment travelling on the old rails; positioning cradles having rail base flange-receiving recesses therein spaced apart at narrow gauge on spaced ties between the old rails to be replaced; aligning a reference mark on each of the cradles with the reference stripe on the ties; continuously threading the new rails into rail base flange-receiving recesses in the cradles from the rail cars by equipment travelling behind the rail cars on the old rails to form a narrow gauge service track; removing all spikes and anchors from the old rails of the standard gauge track by equipment travelling in the same direction and following the equipment threading the new rails onto the cradles, brushing the ends of the ties outside of the old rails at standard gauge so as to clean the end surface of the ties and provide a temporary rail seat by equipment travelling in the same direction as and following the spike and anchor removing equipment; threading the old rails outwardly onto the cleaned end surface of the ties and gauging the old rails to a predetermined wide gauge by equipment travelling on the narrow gauge service track in the same direction and following the cleaning equipment to form a wide gauge service track; removing the old tie plates of the standard gauge; re-conditioning the surface of the ties beneath the old tie plates to provide new seating surfaces; positioning tie plates on the re-conditioned surfaces of the ties between the narrow gauge service track and the wide service track; threading the new rails from their narrow gauge position outwardly onto the tie plates at approximately standard gauge by equipment travelling on the wide gauge service track in the same direction as the previously-mentioned equipment, gauging the new rails to standard gauge and spiking the same to the ties; and then removing the old rails from the ties.

28. The method as claimed in claim 27 wherein the positioning of the tie plates on the re-conditioned surfaces of the ties is accomplished by gauging each of the tie plates with respect to the base flange of the new rail closest to the same.

29. The method as claimed in claim 28 wherein the gauging of the new rails to standard gauge is accomplished by first gauging one of the new rails with respect to the reference stripes painted on the ties and then spot spiking the same; and then gauging the other of the new rails to standard gauge with respect to the first new rail and spot spiking the same; and then spiking both new rails to every tie.

30. The method as claimed in claim 27 wherein the new rails are threaded to approximately standard gauge which is slightly greater than narrow gauge and wherein gauging of the new rails to standard gauge is accomplished by moving the new rails inwardly.

31. The method as claimed in claim 27 wherein the step of removing the old rails from the ties is accomplished by the same equipment used for threading the new rails to narrow gauge but by operating the same in reverse to pull the old rails across the ties and up onto the rail cars.

32. The method as claimed in claim 27 wherein the new rails are threaded from the rail cars so as to overlap the rails of the standard gauge track to which they are to be jointed and wherein equipment travelling on the narrow gauge service track is transferred from the standard gauge track to the overlap portion of the narrow gauge track and then the narrow gauge track is pulled forward so that the ends rails of the same are even with the ends rails of the standard gauge track to which it is to be jointed.

33. A method of replacing the rails of a standard gauge track on existing ties of a track structure with continuous ribbon rails comprising the steps of: laying the new rails at a narrow gauge between the old rails of the standard gauge track to form a first service track; spreading the old rails outwardly of the first service track to predetermined positions to form a second service track at wide gauge; spreading the new rails from their narrow gauge position to a position of substantially standard gauge; and removing the old rails from the ties.

References Cited by the Examiner

UNITED STATES PATENTS

| 758,524 | 4/1904 | Goldie | 104—2 |
| 1,283,621 | 11/1918 | Baldwin | 104—5 |
| 1,286,495 | 12/1918 | Baldwin | 104—5 |
| 1,317,813 | 10/1919 | Norly | 104—7 |

MILTON BUCHLER, *Primary Examiner.*

ARTHUR L. LA POINT, *Examiner.*

R. A. BERTSCH, *Assistant Examiner.*